US012795485B2

(12) United States Patent
Xing et al.

(10) Patent No.: US 12,795,485 B2
(45) Date of Patent: Nov. 10, 2026

(54) NETWORK SLICE HANDOVER METHOD AND APPARATUS

(71) Applicant: HUAWEI TECHNOLOGIES CO., LTD., Shenzhen (CN)

(72) Inventors: Xiaocheng Xing, Xi'an (CN); Zijian Su, Xi'an (CN); Xiaoqian Jia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 325 days.

(21) Appl. No.: 18/739,133

(22) Filed: Jun. 10, 2024

(65) Prior Publication Data

US 2024/0334282 A1 Oct. 3, 2024

Related U.S. Application Data

(63) Continuation of application No. PCT/CN2022/125306, filed on Oct. 14, 2022.

(30) Foreign Application Priority Data

Dec. 10, 2021 (CN) ........................ 202111509743.8

(51) Int. Cl.
*H04W 36/00* (2009.01)
*H04W 48/18* (2009.01)
*H04W 72/0453* (2023.01)

(52) U.S. Cl.
CPC ........... *H04W 36/13* (2023.05); *H04W 48/18* (2013.01); *H04W 72/0453* (2013.01)

(58) Field of Classification Search
CPC ................ H04W 36/13; H04W 48/18; H04W 72/0453; H04W 36/00; H04W 36/0055; H04W 36/14; H04W 36/34; H04W 36/30
See application file for complete search history.

(56) References Cited

U.S. PATENT DOCUMENTS

2018/0324645 A1 11/2018 Park et al.
2021/0160153 A1* 5/2021 Akman ............... H04L 41/0816
2023/0040440 A1* 2/2023 Xu ........................ H04W 28/26
2023/0379775 A1* 11/2023 Dauneria .......... H04W 36/0011
(Continued)

FOREIGN PATENT DOCUMENTS

CN 109218046 A 1/2019
CN 109600246 A 4/2019
(Continued)

OTHER PUBLICATIONS

3GPP TR 22.867 V18.1.0 (Sep. 2021) 3rd Generation Partnership Project;Technical Specification Group Services and System Aspects;Study on 5G Smart Energy and Infrastructure (Release 18),total 96 pages.
(Continued)

*Primary Examiner* — Abdullahi Ahmed

(57) ABSTRACT

A network slice handover method and apparatus as applied to the network slice field can include: a slice selection network element receives resource information of an original network slice from a network slice management function network element, where the resource information of the original network slice includes a performance indicator of the original network slice, alarm information of the original network slice, and/or an analysis report for the original network slice; determines, based on the resource information of the original network slice and a network slice handover policy, whether to hand over a terminal device in the original network slice to a target network slice.

15 Claims, 7 Drawing Sheets

100

(56) References Cited

U.S. PATENT DOCUMENTS

| | | | | |
|---|---|---|---|---|
| 2024/0292301 | A1 * | 8/2024 | Naseer-Ul-Islam | H04W 36/0085 |
| 2025/0048213 | A1 * | 2/2025 | Pateromichelakis | H04L 41/0806 |

FOREIGN PATENT DOCUMENTS

| | | | |
|---|---|---|---|
| CN | 110062407 | A | 7/2019 |
| CN | 112152855 | A | 12/2020 |
| EP | 3739966 | A1 | 11/2020 |
| WO | 2017140204 | A1 | 8/2017 |
| WO | 2020209861 | A1 | 10/2020 |

OTHER PUBLICATIONS

3GPP TS 23.434 V17.3.0 (Sep. 2021) 3rd Generation Partnership Project;Technical Specification Group Services and System Aspects-;Service Enabler Architecture Layer for Verticals (SEAL);Functional architecture and information flows; (Release 17),total 181 pages.

3GPP TS 28.545 V17.0.0 (Jun. 2021) 3rd Generation Partnership Project;Technical Specification Group Services and System Aspects;Management and orchestration;Fault Supervision (FS);(Release 17),total 30 pages.

3GPP TS 28.554 V17.4.0 (Sep. 2021) 3rd Generation Partnership Project;Technical Specification Group Services and System Aspects;Management and orchestration;5G end to end Key Performance Indicators (KPI) (Release 17),total 44 pages.

3GPP TR 23.700-99 V0.4.0 (Nov. 2021) 3rd Generation Partnership Project;Technical Specification Group Services and System Aspects;Study on Network Slice Capability Exposure for Application Layer Enablement (NSCALE) (Release 18),total 36 pages.

3GPP TR 28.809 V17.0.0 (Mar. 2021) 3rd Generation Partnership Project;Technical Specification Group Services and System Aspects;Management and orchestration;Study on enhancement of Management Data Analytics (MDA) (Release 17),total 95 pages.

* cited by examiner

NETWORK SLICE HANDOVER METHOD AND APPARATUS

CROSS-REFERENCE TO RELATED APPLICATIONS

This is a continuation of International Application No. PCT/CN2022/125306 filed on Oct. 14, 2022, which claims priority to Chinese Patent Application No. 202111509743.8 filed on Dec. 10, 2021. The disclosures of the applications are hereby incorporated by reference in their entireties.

TECHNICAL FIELD

Disclosed embodiments relate to the field of communication technologies, and in particular, to a network slice handover method and apparatus.

BACKGROUND

A network slice (NS) is one of key technologies for a 5th generation (5G) mobile communication system. The network slice is a complete instantiated logical network including a group of network functions (NFs), and is intended to use optimal resource allocation to more efficiently address a special requirement of a vertical service (for example, a high-definition video service that has a high requirement on bandwidth and a gaming service that has a high requirement on latency). The network slice enables an operator to construct a plurality of end-to-end, virtual, isolated, and on-demand dedicated logical networks on a physical network. The logical networks have different network functions to better adapt to differentiated requirements of different vertical services.

If a current network slice in which a user equipment (UE) resides is faulty or cannot meet a service requirement of the UE, the UE may be handed over to another network slice to ensure service continuity. For example, in an industrial scenario, due to a high requirement on availability of a network service, when connecting to a 5G slice, an industrial terminal may need to back up a 5G slice of a same operator or another operator, so that the UE is handed over to the backup network slice when a connection problem occurs in the current slice, and the backup network slice continues to provide a service for the UE to ensure service continuity.

How to perform network slice handover for the UE is a problem that needs to be resolved currently.

SUMMARY

This application provides a network slice handover method and apparatus to ensure service experience of post-network slice handover of a terminal device.

According to a first aspect, a network slice handover method provides a slice selection network element receives resource information of an original network slice from a network slice management function network element, where the resource information of the original network slice includes one or more of the following information: a performance indicator of the original network slice, alarm information of the original network slice, and an analysis report for the original network slice. The slice selection network element determines, based on the resource information of the original network slice and a network slice handover policy, whether to hand over a terminal device in the original network slice to a target network slice, where the network slice handover policy includes a trigger condition for network slice handover, an identifier of the target network slice, an identifier of the original network slice, and an identifier and/or an application identifier of the terminal device in the original network slice.

Based on the foregoing solution, the slice selection network element may determine, based on the resource information of the original network slice and the network slice handover policy, whether to perform network slice handover for the terminal device in the original network slice, to ensure service experience of post-handover of the terminal device.

With reference to the first aspect, in some implementations, that the slice selection network element determines, based on the resource information of the original network slice and a network slice handover policy, whether to hand over a terminal device in the original network slice to a target network slice includes: The slice selection network element determines whether the resource information of the network slice meets the trigger condition for network slice handover. When the resource information of the network slice meets the trigger condition for network slice handover, the slice selection network element determines to hand over the terminal device in the network slice to the target network slice.

Based on the foregoing solution, when the resource information of the original network slice meets the trigger condition for network slice handover, the slice selection network element determines to hand over the terminal device in the network slice to the target network slice. In other words, the slice selection network element may determine a moment for the network slice handover, so that the slice selection network element can promptly perform the network slice handover for the terminal device in the original network slice that meets the trigger condition, to avoid compromising service experience of the terminal device due to untimely network slice handover.

With reference to the first aspect, in some implementations, the method further includes: The slice selection network element receives resource information of the target network slice from the network slice management function network element. The slice selection network element determines that the resource information of the target network slice does not meet the trigger condition.

Based on the foregoing solution, when the resource information of the original network slice meets the trigger condition for network slice handover, and the resource information of the target network slice does not meet the trigger condition for network slice handover, the slice selection network element determines that the terminal device in the network slice may be handed over to the target network slice. In other words, when the original network slice cannot meet a requirement but the target network slice meets the requirement, the terminal device in the original network slice may be handed over to the target network slice, thereby ensuring the service experience of the terminal device by performing the network slice handover for the terminal device.

With reference to the first aspect, in some implementations, the trigger condition for network slice handover includes one or more of the following: A performance indicator of a network slice is greater than or equal to a first threshold, or is less than or equal to a second threshold. The slice selection network element receives alarm information of the network slice and/or the performance indicator of the network slice. The slice selection network element receives alarm information of the network slice, where the alarm information is high-priority alarm information. The analysis report for the network slice meets a handover condition.

The first threshold and the second threshold herein may be thresholds representing different meanings. For example, the first threshold is a latency threshold, the second threshold is a bandwidth threshold, a performance indicator corresponding to the first threshold is a latency, and a performance indicator corresponding to the second threshold is a bandwidth. In other words, the trigger condition for network slice handover may include: The latency of the network slice is greater than or equal to the latency threshold, or the bandwidth of the network slice is less than or equal to the bandwidth threshold.

Based on the foregoing solution, when the performance indicator of the original network slice is greater than or equal to the first threshold, or is less than or equal to the second threshold, or when the slice selection network element receives the alarm information and/or the performance indicator of the network slice, or when the slice selection network element receives the alarm information of the original network slice, where the alarm information is the high-priority alarm information, or when the analysis report for the original network slice meets the handover condition, the slice selection network element may hand over the terminal device in the network slice to the target network slice. That is, when the original network slice meets any of the foregoing conditions, the slice selection network element may hand over the terminal device in the original network slice to the target network slice in a timely manner, to avoid compromising the service experience of the terminal device due to untimely network slice handover.

With reference to the first aspect, in some implementations, the method further includes: The slice selection network element sends a subscription request message to the network slice management function network element, where the subscription request message includes the identifier of the original network slice, and the subscription request message is used to subscribe to the resource information of the original network slice.

Based on the foregoing solution, the slice selection network element may subscribe to the resource information of the original network slice from the network slice management function network element, so that the slice selection network element can determine whether the resource information of the original network slice meets the trigger condition. If the resource information of the original network slice meets the trigger condition, the slice selection network element hands over the terminal device in the original network slice to the target network slice in a timely manner.

With reference to the first aspect, in some implementations, when the slice selection network element determines to hand over the terminal device in the original network slice to the target network slice, the method further includes: The slice selection network element sends a network slice configuration request message to a network slice capability management service provisioning network element, where the network slice configuration request message includes the identifier of the target network slice and the identifier and/or the application identifier of the terminal device in the original network slice, and the network slice configuration request message is used to request to configure the target network slice for the terminal device in the network slice.

Based on the foregoing solution, when determining to hand over the terminal device in the original network slice to the target network slice, the slice selection network element may request the network slice capability management service provisioning network element to configure the target network slice for the terminal device in the original network slice to hand over the terminal device in the original network slice to the target network slice, thereby ensuring the service experience of the terminal device.

With reference to the first aspect, in some implementations, the method further includes: The slice selection network element receives a network slice configuration response message from the network slice capability management service provisioning network element, where the network slice configuration response message indicates that the target network slice is successfully configured for the terminal device. The slice selection network element sends a network slice configuration feedback message to an application server based on the network slice configuration response message, where the network slice configuration feedback message includes the identifier of the target network slice and the identifier of the terminal device in the original network slice.

Based on the foregoing solution, when the slice selection network element determines, based on the network slice configuration response message from the network slice capability management service provisioning network element, that the terminal device in the original network slice is successfully handed over to the target network slice, the slice selection network element may send the identifier of the target network slice and the identifier of the terminal device in the original network slice to the application server to indicate that the terminal device in the original network slice is handed over to the target network slice.

Based on the foregoing solution, after receiving the identifier of the target network slice and the identifier of the original network slice from the slice selection network element, the application server may modify or reconfigure the network slice handover policy.

With reference to the first aspect, in some implementations, when the slice selection network element determines not to hand over the terminal device in the network slice to the target network slice, the method further includes: The slice selection network element sends a network slice configuration feedback message to an application server, where the network slice configuration feedback message includes the identifier of the original network slice, and the network slice configuration feedback message indicates that the network slice handover for the terminal device in the original network slice fails.

Based on the foregoing solution, when the slice selection network element does not hand over the terminal device in the original network slice to the target network slice, the slice selection network element may indicate to the application server, so that the application server may determine that the network slice handover for the terminal device fails.

Based on the foregoing solution, when determining that the network slice handover for the terminal device fails, the application server may formulate a response policy, for example, re-modify the network slice handover policy, so that when the resource information of the original network slice meets the trigger condition for network slice handover, the terminal device in the original network slice may be successfully handed over to the target network slice, to ensure service experience of the post-handover of the terminal device.

With reference to the first aspect, in some implementations, the network configuration feedback message further includes a cause value and/or recommended behavior indication information, where the cause value indicates a reason why the terminal device in the original network slice is not handed over to the target network slice, and the recommended behavior indication information indicates an operation to be performed by the application server.

Based on the foregoing solution, when the slice selection network element does not hand over the terminal device in the original network slice to the target network slice, the slice selection network element may indicate to the application server, and indicate the cause value and/or the recommended behavior indication information, so that the application server may formulate the response policy based on the cause value and/or the recommended behavior. For example, if the cause value indicates that a failure cause is that resource utilization of the target network slice is greater than a preset threshold, the application server may modify the network slice handover policy or add another target network slice to the network slice handover policy.

With reference to the first aspect, in some implementations, the method further includes: The slice selection network element receives a policy configuration request message from a network slice capability management service consumption network element or the application server, where the policy configuration request message includes the network slice handover policy. The slice selection network element stores the network slice handover policy.

Based on the foregoing solution, the network slice capability management service consumption network element or the application server may configure the network slice handover policy for the slice selection network element. The slice selection network element may determine the target network slice, the trigger condition for network slice handover, and the identifier of the terminal device in the original network slice according to the network slice handover policy. Therefore, when the original network slice meets the trigger condition for network slice handover, the terminal device in the original network slice may be handed over to the target network slice, to ensure service experience of the post-handover of the terminal device.

With reference to the first aspect, in some implementations, the method further includes: The slice selection network element receives a policy modification request message from the network slice capability management service consumption network element or the application server, where the policy modification request message includes policy modification information, and the policy modification information indicates modification performed on the network slice handover policy. The slice selection network element modifies the network slice handover policy based on the policy modification information.

Based on the foregoing solution, the slice selection network element may modify the network slice handover policy based on a request or an indication of the network slice capability management service consumption network element or the application server. For example, when the network slice handover for the terminal device in the original network slice fails, the network slice capability management service consumption network element or the application server may modify the network slice handover policy, so that the terminal device in the original network slice may be handed over to the target network slice, to ensure the service experience of the terminal device.

In some implementations of the first aspect, the method further includes: The slice selection network element receives a policy deletion request message from the network slice capability management service consumption network element or the application server, where the policy deletion request message indicates to delete the network slice handover policy. The slice selection network element deletes the network slice handover policy.

Based on the foregoing solution, the slice selection network element may delete the network slice handover policy based on the request or the indication of the network slice capability management service consumption network element or the application server.

With reference to the first aspect, in some implementations, the method further includes: The slice selection network element locally updates an association relationship between the identifier of the target network slice and the identifier of the terminal device.

Based on the foregoing solution, when the slice selection network element determines, based on the network slice configuration response message from the network slice capability management service provisioning network element, that the terminal device in the original network slice is successfully handed over to the target network slice, the slice selection network element may update the association relationship between the identifier of the target network slice and the identifier of the terminal device, for use in a subsequent process.

According to a second aspect, a network slice selection method is provided, where the method includes: An application server receives a network slice configuration feedback message from a slice selection network element, where the network slice configuration feedback message includes an identifier of an original network slice, and the network slice configuration feedback message indicates that network slice handover for a terminal device in the original network slice fails. The application server determines a modification solution for a network slice handover policy based on the network slice configuration feedback message. The application server sends a network slice handover policy modification request message to the slice selection network element, where the network slice handover policy modification request message includes an identifier of the network slice handover policy and policy modification information, and the policy modification information indicates the modification solution.

Based on the foregoing solution, when the application server determines that the terminal device in the original network slice is not successfully handed over to a target network slice, the application server may modify the network slice handover policy, so that when the original network slice meets a trigger condition for network slice handover, the network slice handover for the terminal device may be performed to ensure service experience of the terminal device.

With reference to the second aspect, in some implementations, the network slice configuration feedback message includes a cause value and/or recommended behavior indication information, where the cause value indicates a reason why the terminal device in the original network slice is not handed over to the target network slice, and the recommended behavior indication information indicates an operation to be performed by the application server. That the application server determines a modification solution for a network slice handover policy based on the network slice configuration feedback message includes: The application server determines the modification solution for the network slice handover policy based on the cause value and/or the recommended behavior indication information.

Based on the foregoing solution, the application server may determine the modification solution for the network slice handover policy based on the cause value, so that the modified network slice handover policy may enable the terminal device in the original network slice to be successfully handed over to the target network slice, to ensure service experience of the post-network slice handover of the terminal device.

With reference to the second aspect, in some implementations, the method further includes: The application server sends a policy configuration request message to the slice selection network element, where the policy configuration request message includes the network slice handover policy, and the policy configuration request message is used to request to configure the network slice handover policy.

Based on the foregoing solution, the application server may configure the network slice handover policy for the slice selection network element, so that the slice selection network element may determine, according to the network slice handover policy, whether the terminal device in the original network slice may be handed over to the target network slice, to ensure the service experience of the terminal device.

With reference to the second aspect, in some implementations, the method further includes: The application server sends a policy deletion request message to the slice selection network element, where the policy deletion request message includes the identifier of the network slice handover policy, and the policy deletion request message indicates to delete the network slice handover policy.

Based on the foregoing solution, the application server may indicate the slice selection network element to delete the network slice handover policy, to save resources when there is no network slice handover requirement.

In some implementations of the second aspect, the method further includes: The application server sends a policy query request message to the slice selection network element, where the policy query request message includes the identifier of the network slice handover policy, and the policy deletion request message indicates to delete the network slice handover policy.

Based on the foregoing solution, the application server may query the slice selection network element for the network slice handover policy.

According to a third aspect, a network slice handover apparatus is provided. The apparatus is configured to perform the method according to the foregoing first aspect or second aspect. The apparatus may include a unit and/or a module configured to perform the method according to the first aspect or the second aspect, for example, a processing unit and/or a communication unit. In an implementation, the apparatus is a slice selection network element. When the apparatus is the slice selection network element, the communication unit may be a transceiver or an input/output interface, and the processing unit may be a processor.

In another implementation, the apparatus is a chip, a chip system, or a circuit used in the slice selection network element. When the apparatus is the chip, the chip system, or the circuit used in a communication device, the communication unit may be the input/output interface, an interface circuit, an output circuit, an input circuit, a pin, a related circuit, or the like on the chip, the chip system, or the circuit; and the processing unit may be the processor, a processing circuit, a logic circuit, or the like.

In a possible case, the apparatus is the chip, the chip system, or the circuit in the slice selection network element. In this case, the apparatus may include the unit and/or the module configured to perform the method according to the first aspect, for example, the processing unit and/or the communication unit.

In another possible case, the apparatus is a chip, a chip system, or a circuit in an application server. In this case, the apparatus may include the unit and/or the module configured to perform the method according to the second aspect, for example, the processing unit and/or the communication unit.

Optionally, the transceiver may be a transceiver circuit, and the input/output interface of the transceiver may be an input/output circuit.

According to a fourth aspect, a network slice handover apparatus is provided. The apparatus includes: a memory, configured to store a program; and a processor, configured to execute the program stored in the memory. When the program stored in the memory is executed, the processor is configured to perform the method according to the foregoing first aspect or second aspect.

According to a fifth aspect, a processor is configured to perform the method according to each of the foregoing aspects. In a process of performing these methods, a process of sending the foregoing information and a process of obtaining/receiving the foregoing information in the foregoing methods may be understood as a process of outputting the foregoing information by the processor and a process of receiving the foregoing inputted information by the processor. When outputting the information, the processor outputs the information to a transceiver, so that the transceiver performs transmission. After the information is output by the processor, other processing may further need to be performed on the information before the information arrives at the transceiver. Similarly, when the processor receives the foregoing inputted information, the transceiver obtains/receives the foregoing information, and inputs the foregoing information into the processor. Further, after the transceiver receives the foregoing information, other processing may need to be performed on the foregoing information before the information is input into the processor.

Based on the foregoing principle, for example, receiving the request message mentioned in the foregoing method may be understood as receiving the input information by the processor.

Unless otherwise specified, or if operations such as transmitting, sending, and obtaining/receiving related to the processor do not contradict an actual function or internal logic of the operations in related descriptions, all the operations may be more generally understood as operations such as outputting, receiving, and inputting of the processor, instead of operations of transmitting, sending, and receiving directly performed by a radio frequency circuit and an antenna.

In an implementation process, the processor may be a processor specially configured to perform these methods, or a processor, for example, a general-purpose processor, that executes computer instructions in a memory to perform these methods. The memory may be a non-transitory memory such as a read-only memory (ROM). The memory and the processor may be integrated on a same chip, or may be separately disposed on different chips. A type of the memory and a manner of disposing the memory and the processor are not limited in embodiments of this application.

According to a sixth aspect, a computer-readable storage medium is provided. The computer-readable medium stores program code to be executed by a device, and the program code is used to perform the method according to the foregoing first aspect or second aspect.

According to a seventh aspect, a computer program product including instructions is provided. When the computer program product runs on a computer, the computer is enabled to perform the method according to the foregoing first aspect or second aspect.

According to an eighth aspect, a chip is provided. The chip includes a processor and a communication interface. The processor reads, through the communication interface, instructions stored in a memory, to perform the method according to the foregoing first aspect or second aspect.

Optionally, in an implementation, the chip may further include the memory. The memory stores instructions, and the processor is configured to execute the instructions stored in the memory. When the instructions are executed, the processor is configured to perform the method according to the foregoing first aspect or second aspect.

DESCRIPTION OF EMBODIMENTS

To make objectives, technical solutions, and advantages of this application clearer, the following describes the technical solutions in embodiments with reference to the accompanying drawings. A specific operation method in a method embodiment may also be applied to an apparatus embodiment or a system embodiment. In the descriptions of this application, unless otherwise specified, "a plurality of" means two or more than two.

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

It may be understood that numbers in this application are merely used for differentiation for ease of description, and are not used to limit the scope of this application. The sequence numbers of the foregoing processes do not mean execution sequences, and the execution sequences of the processes should be determined based on functions and internal logic of the processes.

In the specification, claims, and accompanying drawings of this application, the terms "first", "second", "third", "fourth", and various other ordinal number terms (if existent) are intended to distinguish between similar objects but do not necessarily indicate a specific order or sequence. It should be understood that the data termed in such a way are interchangeable in proper circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
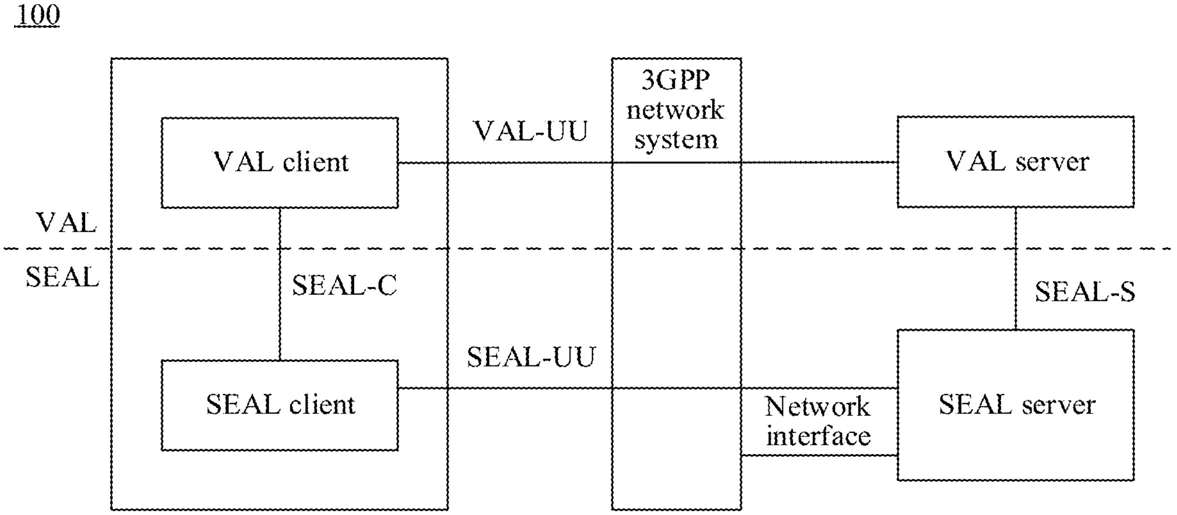
FIG. 1 is a schematic diagram of a network architecture applicable to an embodiment of this application.

FIG. 1 is a schematic diagram of a network architecture 100 of a service enabler architecture layer for verticals (service enabler architecture layer for verticals, SEAL) applicable to an embodiment of this application. In a vertical application layer (VAL), a VAL client communicates with a VAL server through a VAL-UU interface. The VAL-UU interface supports two information transmission modes: unicast and multicast. The service enabler architecture layer for verticals in a UE and a server is called a SEAL client and a SEAL server, respectively. The SEAL may provide service enabler layer support functions (for the VAL client through a SEAL-C interface. The VAL server may communicate with the SEAL server through a SEAL-S interface. The SEAL server may communicate with a 3GPP network through a network interface provided by 3GPP, including an N33 interface provided by a network exposure function (NEF) of a core network element, a service-based interface provided by an OAM, and the like.

The vertical application layer supports the following SEAL services:

Location management (Location management function)

Group management (group management function)

Configuration management (configuration management function)

Key management (key management function)

Network resource management (network resource management function)

Network slice capability management (network slice capability management function)

The VAL server may invoke one or more of the foregoing SEAL capabilities to use a 3GPP network capability.

Figure 2:
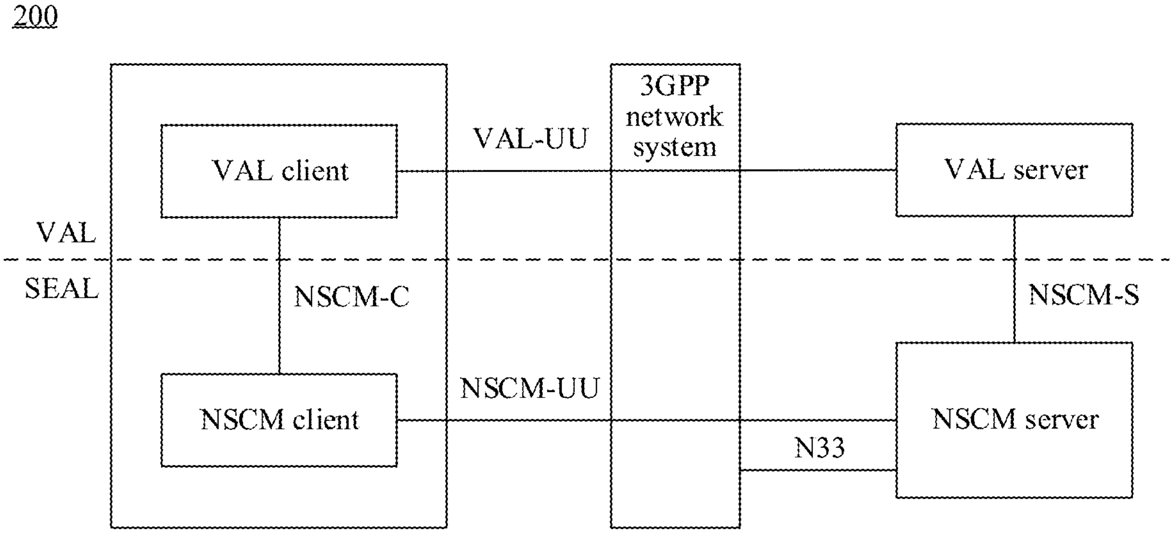
FIG. 2 is a schematic diagram of another network architecture applicable to an embodiment of this application.

FIG. 2 is a schematic diagram of a network architecture 200 for network slice capability management (NSCM) according to an embodiment of this application. The network architecture 200 is configured to support the network slice capability management for vertical applications. A network slice capability management server (NSCM server) function entity provides a function in terms of a network slice to support a VAL application. This enablement supports mapping or migration of one or more vertical applications to one or more network slices. A network slice capability management client (NSCM client) function entity is used as a slice enablement application client. The NSCM client may interact with the NSCM server, to trigger network slice adaptation caused by an application requirement change. The application requirement change herein may be an application QoS requirement change, a service operation change, or the like. The NSCM client may receive a network slice/DNN remapping notification from the NSCM server. The NSCM client communicates with the NSCM server through an NSCM-UU interface. The network slice capability management client provides support for a network slice capability management function for the VAL client through an NSCM-C interface. The VAL server communicates with the NSCM server through an NSCM-S interface. It is assumed that the NSCM server is deployed in a 5G system domain, as an AF, the NSCM server may communicate with a 5G core network function by using an NEF (N33) reference point (used to interact with a PCF).

It should be understood that the foregoing network architecture used in embodiments of this application is merely an example, and a network architecture applicable to embodiments of this application is not limited thereto. Any network architecture that can implement functions of the foregoing network elements is applicable to embodiments of this application.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

The aspects or features of embodiments of this application may be implemented by using a method or an apparatus, or may be implemented through a product using standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD), or a digital versatile disc (DVD)), a smart card and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a wireless channel, and various other media that can store, contain, and/or carry instructions and/or data.

With rapid development of wireless communication technologies, a current communication network faces diversified application scenarios. A network slice may provide a customized virtual network for different application requirements, to meet differentiated performance indicators in different scenarios. The network slice not only can provide a network service with quality assurance for a user, but also can improve resource utilization and reduce costs by sharing resources. When location information or service information of a terminal device changes, or a fault or performance degradation occurs in a current network slice for the terminal device, service or use experience of the terminal device may be compromised. In this case, the terminal device may be handed over to a backup network slice that meets the requirement, to meet a service requirement of the terminal device.

For example, in a power grid scenario, a power grid industry user supplies power by area by using a distributed power distribution network, and forms a microgrid in an area. The microgrid can ensure power self-sufficiency to some extent. In normal cases, a 5G communication terminal of a power grid works in a large dedicated electronic slice, and all gNBs and core networks in a microgrid support normal running of the slice. When a large-scale power outage occurs, gNBs in the microgrid may stop working due to the power outage. In this case, the 5G power terminal may be handed over to another network slice based on gNBs that can still work. The gNBs that are still working form a new slice to support communication of the 5G power terminal, ensure that a power grid device can communicate with a power grid control center, and support power recovery. If the 5G power terminal in the microgrid cannot maintain communication with the outside of the microgrid, the terminal may also be handed over to another network slice, to maintain communication between power grid devices within the coverage of the microgrid, and maintain electronic operation within the coverage of the microgrid.

Figure 3:
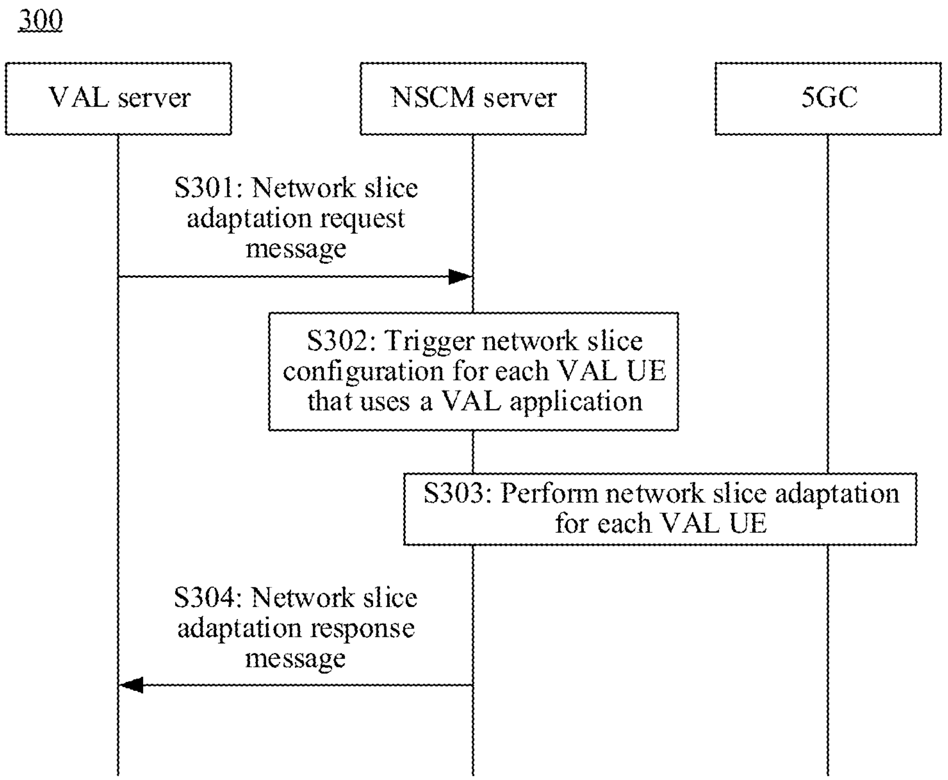
FIG. 3 is a schematic flowchart of network slice adaptation.

FIG. 3 is an example flowchart of a network slice adaptation method 300 for a VAL application. The method 300 may be used to perform network slice handover for a vertical application terminal. The method 300 includes the following steps.

S301: A VAL server sends a network slice adaptation request message to an NSCM server.

For example, the VAL server sends a network slice adaptation request message for the VAL application (and a VAL UE that uses the VAL application) to the NSCM server. The network slice adaptation request message may be specific to the VAL UE that uses the VAL application, or may be specific to the VAL application. It should be understood that the VAL UE that uses the VAL application may also be referred to as the VAL UE in the VAL application. For example, the network slice adaptation request message is used to request to perform network slice (and optional DNN) adaptation for all VAL UEs that use a VAL application, or the network slice adaptation request message is used to request to remap the VAL application to different network slices (and/or map the VAL application to different DNNs). It should be understood that a name of the message herein does not limit the message. The "network slice adaptation" herein may also be referred to as "network slice configuration", "network slice selection", or the like in some scenarios. This is not limited in this application.

Table 1 shows a list of some parameters that may be carried in the network slice adaptation request message.

TABLE 1

| Information element (Information element) | Status (Status) | Description (Description) |
|---|---|---|
| VAL service ID | Mandatory | Identifier of a VAL application |
| List of VAL UE IDs | Mandatory | Identifiers of the VAL UEs |
| Network slice adaptation cause | Optional | Reason for network slice adaptation |
| Requested S-NSSAI | Optional | Identifier of a target network slice |
| Requested DNN | Optional | Identifier of a target DNN |

It can be learned from Table 1 that the network slice adaptation request message includes a VAL service ID and a list of VAL UE IDs. Optionally, the network slice adaptation request message may further include the reason for network slice adaptation, the identifier of the target network slice (or referred to as a requested network slice), and the identifier of the target DNN (or referred to as the requested DNN).

S302: The NSCM server triggers network slice configuration for each VAL UE that uses the VAL application.

For example, the NSCM server receives the network slice adaptation request message from the VAL server, and the NSCM triggers, based on the network slice adaptation request message, the network slice configuration for each VAL UE that uses the VAL application (or each VAL UE in the VAL application).

S303: The NSCM server configures a network slice for each VAL UE by using a 5GC.

For example, the NSCM server provides updated S-NSSAI and an updated DNN for each VAL UE. Specifically, the NSCM server configures the network slice for the VAL UE by invoking an interface of a core network. For a specific configuration process, refer to an existing protocol. This is not limited in this application.

S304: The NSCM server sends a network slice adaptation response message to the VAL server.

For example, after configuring the network slice, the NSCM server sends the network slice adaptation response message to the VAL server, and provides a network slice adaptation result for each VAL UE via the network slice adaptation response message.

Therefore, in the foregoing method process, the UE (or a vertical industry client) determines information such as a moment for the network slice handover and a network slice handover target, and the SEAL service platform provides only a slice configuration interface. However, the vertical industry client cannot perceive information such as resource status of a network slice, and therefore may not be able to select a proper network slice at an appropriate time. Consequently, service reliability and availability of the vertical industry are affected.

Figure 4:
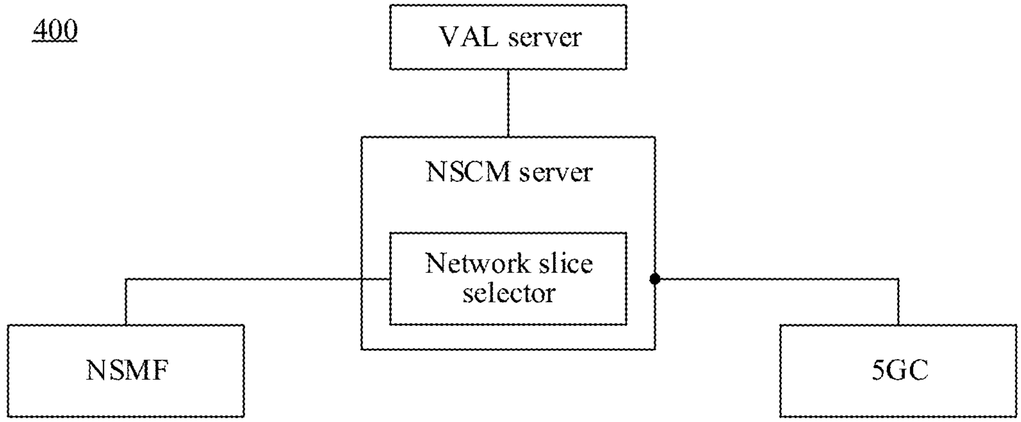
FIG. 4 is a schematic diagram of a network system according to an embodiment of this application.
Figure 5:
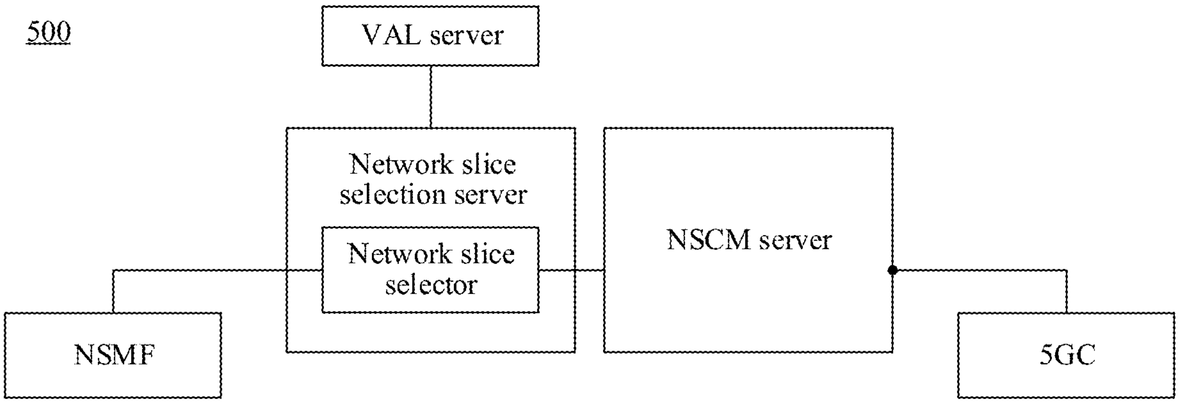
FIG. 5 is a schematic diagram of a network architecture according to an embodiment of this application.

To resolve the foregoing technical problem, a network slice selection network element is introduced in this embodiment of this application. The network slice selection network element may also be referred to as a network slice selector, a network slice configuration network element, a network slice adapter, or the like. The network slice selection network element may be an independent network element, or may be a module in a network element. This is not limited in this application. Any network element or device that implements a similar function should fall within the protection scope of this application. The network slice selector is an automatic slice selection module or network element, may automatically determine a target network slice based on network slice resource information and a network slice handover policy, and invoke a slice selection configuration interface provided by the NSCM to implement a network slice handover function for the UE. The network slice selector may be integrated into the NSCM server, that is, the network slice selector and the NSCM are deployed in a same server. For example, in the system structure 400 shown in FIG. 4, the network slice selector is deployed in the NSCM server. The network slice selector may be further deployed on an independent server. For example, in the system architecture 500 shown in FIG. 5, the network slice selector is deployed in a network slice selection server. In addition, in the system architecture shown in FIG. 4 or FIG. 5, the VAL server (VAL Server) provides the network slice handover policy for the network slice selector, and receives a slice change result notification. The 5GC (5G core network) provides a network slice selection configuration capability for the UE through an NEF. An NSMF (network slice management function) provides network slice-related KPIs, alarms, and prediction reports to the network slice selector.

Figure 6:
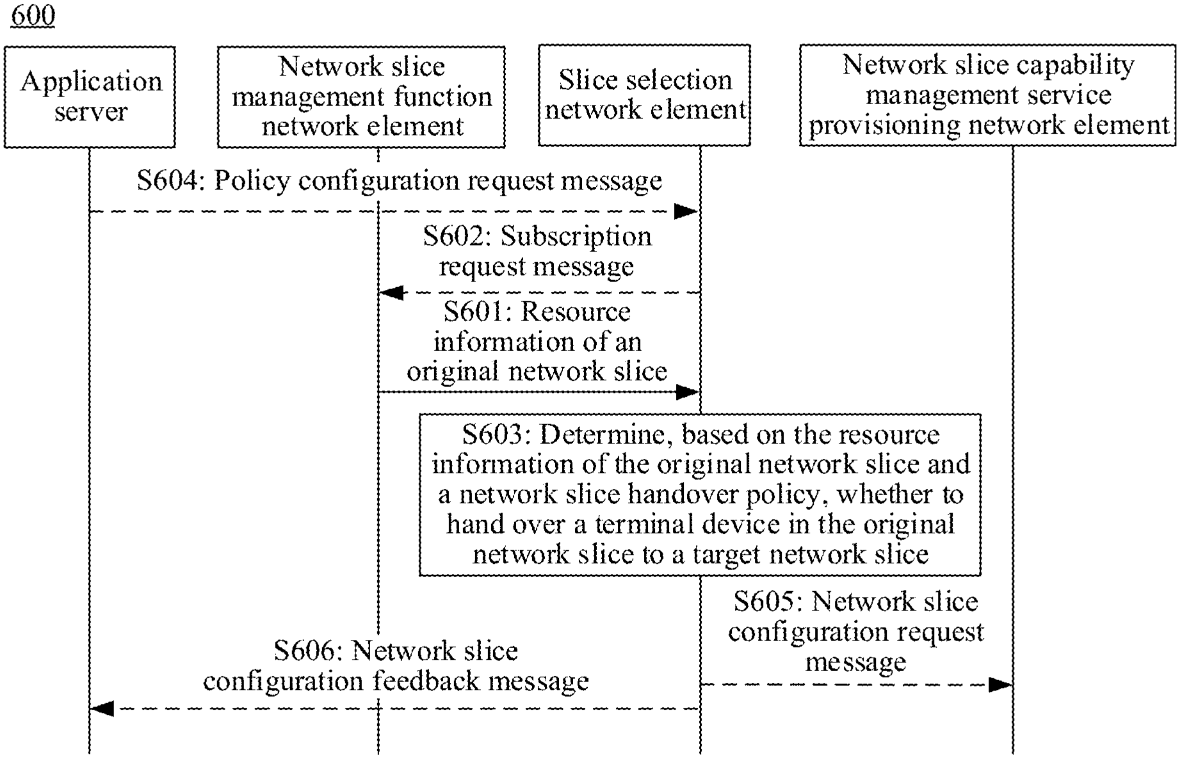
FIG. 6 is a schematic flowchart of a network slice handover method.

For a specific interaction process in the foregoing solution, refer to the method process in FIG. 6. For a specific implementation solution, refer to the detailed description in the method 600.

The following describes in detail a network slice handover method according to an embodiment of this application with reference to accompanying drawings. This embodiment of this application may be applied to the network structure shown in FIG. 1 or FIG. 2, or the system architecture shown in FIG. 4 or FIG. 5. This is not limited in this application.

FIG. 6 is an example flowchart of a network slice handover method 600 according to this embodiment of this application. The method 600 may include the following steps.

S601: A slice selection network element receives resource information of an original network slice from a network slice management function network element.

For example, the resource information of the original network slice includes one or more of the following information: a performance indicator of the original network slice, alarm information of the original network slice, and an analysis report for the original network slice.

The performance indicator of the original network slice may include one or more performance parameters of the original network slice, for example, a latency, a throughput, and utilization. The alarm information of the original network slice is alarm information used when the original network slice is faulty, or cannot be used, or cannot meet a requirement, for example, a fault alarm generated when a physical fault occurs, or a power-off alarm generated when a power outage occurs. The analysis report for the original network slice may be an analysis (optionally, may further include recommended behavior) provided by the network slice management function network element for the original network slice. For example, the network slice management function network element predicts that network resource usage of the original network slice exceeds a threshold after a period of time (for example, 10 minutes).

Optionally, before S601, the slice selection network element may subscribe to the resource information of the original network slice from the network slice management function network element, or the network slice management function network element may send the resource information of the original network slice to the slice selection network element based on a subscription request message of the slice selection network element. For example, S602 is performed.

S602: The slice selection network element sends the subscription request message to the network slice management function network element.

For example, the subscription request message includes an identifier of the original network slice, the subscription request message is used to request to subscribe to the resource information of the original network slice, and the resource information may be one or more of the following: the performance indicator of the original network slice, the alarm information of the original network slice, and the analysis report for the original network slice.

Correspondingly, the network slice management function network element receives the subscription request message from the slice selection network element, and when a specific condition is met, the network slice management function network element sends the resource information of the original network slice to the slice selection network element in S601. The network slice management function network element may determine, based on the subscription request message from the slice selection network element, a condition for reporting the resource information of the original network slice.

For example, the slice selection network element subscribes to the alarm information from the network slice management function network element. When an alarm (for example, an NSI alarm) occurs in the original network slice, the network slice management function network element sends the resource information of the original network slice to the slice selection network element, where the resource information of the original network slice includes the alarm information for the original network slice.

For another example, the slice selection network element subscribes to the performance indicator of the original network slice from the network slice management function network element. In an implementation, the slice selection network element may indicate, in the subscription request message, a condition for reporting the performance indicator of the original network slice. For example, the slice selection network element may include, in the subscription request message, a threshold for one or more performance indicators, for example, a latency threshold. When a latency of the original network slice is greater than or equal to the latency threshold, the network slice management function network element reports the performance indicator of the original network slice to the slice selection network element, where the performance indicator includes the latency of the original network slice. In another implementation, the slice selection network element may indicate, in the subscription request message, a time interval for reporting the performance indicator of the original network slice. For example, the slice selection network element indicates, in the subscription request message, the network slice management function network element to proactively report the latency of the original network slice every 10 minutes. In this implementation, the network slice management function network element reports the resource information of the original network slice to the slice selection network element once every 10 minutes, where the resource information includes the latency of the original network slice.

For another example, the slice selection network element subscribes to the analysis report for the original network slice from the network slice management function network element. After making the analysis report for the original network slice according to a policy of an operator or another condition, the network slice management function network element needs to report the analysis report for the original network slice to the slice selection network element.

S603: The slice selection network element determines, based on the resource information of the original network slice and a network slice handover policy, whether to hand over a terminal device in the original network slice to a target network slice.

For example, after receiving the resource information of the original network slice from the network slice management function network element, the slice selection network element determines, based on the resource information of the original network slice and the network slice handover policy, whether to hand over the terminal device in the original network slice to the target network slice.

The network slice handover policy includes a trigger condition for network slice handover, an identifier of the target network slice, the identifier of the original network slice, and an identifier and/or an application identifier of the terminal device in the original network slice. Optionally, the network slice handover policy may further include a target data network name.

It should be understood that the original network element slice herein is used to represent a current network slice for the terminal device, and the target network slice is used to represent a network slice (or a backup network slice) to which the terminal device is to be handed over. Names herein are merely used to distinguish between different network slices. In some other scenarios, the network slices may have other names. This is not limited in this application.

It should be further understood that the network slice handover policy herein may be preconfigured by an application server or a service consumption network element for the slice selection network element. For example, S604 is performed.

S604: The application server sends a policy configuration request message to the slice selection network element.

For example, the policy configuration request message includes the network slice handover policy, and the policy configuration request message is used to request to configure (or create) the network slice handover policy. Correspondingly, the slice selection network element receives the policy configuration request message, and obtains the network slice handover policy from the policy configuration request message. Then, the slice selection network element creates (or stores) the network slice handover policy locally.

It should be understood that the slice selection network element may subscribe to the resource information of the original network slice from the network slice management function network element after configuring the network slice handover policy. In other words, S602 may be performed after S604.

The following describes an example of an implementation in which the slice selection network element determines, based on the resource information of the original network slice and the network slice handover policy, whether to hand over the terminal device in the original network slice to the target network slice.

For example, after receiving the resource information of the original network slice from the network slice management function network element, the slice selection network element determines, based on the identifier of the original network slice, the network slice handover policy corresponding to the original network slice. The network slice handover policy includes the trigger condition for network slice handover, the identifier of the target network slice, the identifier of the original network slice, and the identifier and/or the application identifier of the terminal device in the original network slice. The following describes an example of the network slice handover policy and a case in which the slice selection network element determines, according to the network slice handover policy, whether to perform the network slice handover for the terminal device.

When the resource information of the original network slice meets the trigger condition for network slice handover, the slice selection network element determines that the terminal device in the original network slice may be handed over to the target network slice. The trigger condition for network slice handover may include one or more of the following: A performance indicator of a network slice is greater than or equal to a first threshold, or is less than or equal to a second threshold; the slice selection network element receives alarm information of the network slice; the slice selection network element receives the performance indicator of the network slice; the slice selection network element receives the alarm information of the network slice, where the alarm information is a high-priority alarm; and an analysis report for the network slice meets a handover condition. The handover condition herein may be, for example, a case in which the network slice may be heavily loaded (or bear a load greater than a threshold) within one hour.

It should be understood that the foregoing first threshold and second threshold may be thresholds representing different meanings. For example, the first threshold is a latency threshold, the second threshold is a bandwidth threshold, the performance indicator corresponding to the first threshold is a latency, and the performance indicator corresponding to the second threshold is a bandwidth. In other words, the trigger condition for network slice handover may include: The latency of the network slice is greater than or equal to the latency threshold, or the bandwidth of the network slice is less than the bandwidth threshold.

For example, if the resource information of the original network slice includes a physical resource alarm of the original network slice, and the trigger condition for network slice handover includes that the slice selection network element receives the alarm information of the network slice, the slice selection network element may determine to hand over the terminal device in the original network slice to the target network element slice.

For another example, if the resource information of the original network slice includes that a latency of the original network slice is 90 ms, and the trigger condition for network slice handover includes that the latency of the original network slice is greater than 100 ms, the slice selection network element may determine not to hand over the terminal device in the original network slice to the target network element slice.

For another example, if the resource information of the original network slice includes that utilization of the original network slice is 70%, and the trigger condition for network slice handover includes that the slice selection network element receives the performance indicator of the network slice, the slice selection network element may determine to hand over the terminal device in the original network slice to the target network element slice. It should be understood that, in this example, the slice selection network element may subscribe to the performance indicator of the original network slice from the network slice management function network element in advance, and further indicate the condition for reporting the performance indicator of the original network slice. For example, when the utilization of the original network slice is greater than 60%, the network slice management function network element sends the utilization of the original network slice to the slice selection network element. Therefore, in this case, the trigger condition may be that the slice selection network element receives the performance indicator of the network slice. In this case, the trigger condition may be similar to the foregoing alarm information.

For another example, if the resource information of the original network slice includes the power-off alarm, the trigger condition for network slice handover includes that the alarm information of the network slice is received, and the alarm information is the high-priority alarm, the original network slice determines, based on a locally preset list of high-priority alarm information, whether the power-off alarm is the high-priority alarm. If yes, the slice selection network element may determine to hand over the terminal device in the original network slice to the target network element slice. It should be understood that the high-priority alarm herein is relative to a general alarm (or a low-priority alarm), and may be set manually. For example, a physical alarm and the power-off alarm may be set in advance as high-priority alarms, and other alarms may be set as general alarms.

Optionally, when the resource information of the original network slice meets the trigger condition, the slice selection network element may directly determine to hand over the terminal device in the original network slice to the target network slice. For example, the target network slice is a backup and unused network slice. Therefore, when the resource information of the original network slice meets the trigger condition for network slice handover, the target network slice may be considered by default to meet a requirement, and the terminal device in the original network slice is directly handed over to the target network slice.

Alternatively, when the resource information of the original network slice meets the trigger condition, the slice selection network element may further determine whether the target network slice meets the trigger condition. If the trigger condition for network slice handover is not met, it indicates that the target network slice can meet the handover requirement, and the slice selection network element determines that the terminal device in the original network slice may be handed over to the target network slice.

In an implementation, when the resource information of the original network slice meets the trigger condition, the slice selection network element sends a resource information request message to the network slice management function network element, where the resource information request message includes the identifier of the target network slice, the resource information request message is used to request resource information of the target network slice, and the resource information may include one or more of the following: a performance indicator of the target network slice, alarm information of the target network slice, or an analysis report for the target network slice. After receiving the resource information request message from the slice selection network element, the network slice management function network element sends the resource information of the target network slice to the slice selection network element. Then, the slice selection network element determines whether the resource information of the target network slice meets the trigger condition for network slice handover. If not, the slice selection network element determines to hand over the terminal device in the original network slice to the target network slice.

In another implementation, the slice selection network element may pre-subscribe to the resource information of the target network element slice from the network slice management function network element. A specific process is similar to that in S602. A difference lies only in that S602 is to subscribe to the resource information of the original network slice, and herein is to subscribe to the resource information of the target network element slice. Therefore, details are not described herein again. It should be understood that the slice selection network element may subscribe to both the resource information of the original network slice and the resource information of the target network slice. In other words, the slice selection network element may subscribe to both the resource information of the original network slice and the resource information of the target network slice from the network slice management function network element in S602. Therefore, in this implementation, when the resource information of the original network slice meets the trigger condition, if the slice selection network element fails to receive the resource information of the target network slice, or the resource information of the target network slice does not meet the trigger condition for network slice handover, the slice selection network element determines to hand over the terminal device in the original network slice to the target network slice.

Optionally, S605: The slice selection network element sends a network slice configuration request message to a network slice capability management service provisioning network element.

For example, when the slice selection network element determines to hand over the terminal device in the original network slice to the target network slice, the slice selection network element sends the network slice configuration request message to the network slice capability management service provisioning network element, where the network slice configuration request message includes the identifier of the target network slice and the identifier and/or the application identifier of the terminal device in the original network slice. The network slice configuration request message is used to request to configure the target network slice for the terminal device in the original network slice.

Correspondingly, the network slice capability management service provisioning network element receives the network slice configuration request message from the slice selection network element, and modifies, by invoking a core network interface, network slice configuration for the terminal device in the original network slice based on the network slice configuration request message. For a specific process, refer to related content in an existing protocol. This is not limited in this application.

After the configuration, the network slice capability management service provisioning network element sends a network slice configuration response message to the slice selection network element, where the network slice configuration response message indicates that the target network slice is successfully configured for the terminal device in the original network slice.

Correspondingly, the slice selection network element receives the network slice configuration response message from the network slice capability management service provisioning network element, and locally updates an association relationship between the identifier of the target network slice and the identifier of the terminal device in the original network slice based on the network slice configuration response message. Then, optionally, S606 is performed.

S606: The slice selection network element sends a network slice configuration feedback message to the application server, where the network slice configuration feedback message includes the identifier of the target network slice and the identifier of the terminal device in the original network slice.

Correspondingly, the slice selection network element receives the network slice configuration feedback message from the application server. If the network slice configuration feedback message includes the identifier of the target network slice and the identifier of the terminal device in the original network slice, the application server may determine that the terminal device in the original network slice is handed over to the target network slice.

Optionally, in this case, the application server may generate a new network slice handover policy, and indicate, by using a policy modification process, the slice selection network element to modify or replace the network slice handover policy. For example, the application server generates the new network slice handover policy, where the network slice handover policy includes a trigger condition for new network slice handover, an identifier of a new target network slice, an identifier of a new original network slice, an identifier of the terminal device in the new original network slice, and the like. It should be understood that the new original network slice herein is the target network slice in the foregoing embodiment, and the terminal device in the new original network slice herein is the terminal device in the original network slice in the foregoing embodiment. The trigger condition for the new network slice handover herein may be the same as or different from the trigger condition for the previous network slice handover. This is not limited in this application. Then, the application server sends a policy modification request message to the slice selection network element. The policy modification request message includes the new network slice handover policy and an identifier of the original network slice handover policy. After receiving the policy modification request message from the application server, the slice selection network element replaces the local network slice handover policy with the new network slice handover policy.

An application function network element may also configure the new network slice handover policy for the slice selection network element by using a policy configuration process. In this case, the application function network element may alternatively indicate, by using a policy deletion process, the slice selection network element to delete the original network slice handover policy.

If in S603, the slice selection network element determines not to hand over the terminal device in the original network slice to the target network slice, or when the target network element slice meets the trigger condition for network slice handover, or when the target network slice cannot meet the handover requirement, the slice selection network element may directly send the network slice configuration feedback message to the application server.

For example, in this case, the network slice configuration feedback message includes the identifier of the original network slice, and the network slice configuration feedback message indicates that the network slice handover for the terminal device in the original network slice fails, or the network slice configuration feedback message indicates that the target network element slice cannot meet the handover requirement, or the network slice configuration feedback message indicates that the target network slice meets the trigger condition for network slice handover. Optionally, the network slice configuration feedback message may further include a cause value, and the cause value indicates a reason why the network slice handover fails. For example, utilization of the target network slice is greater than a threshold.

Correspondingly, the application server receives the network slice configuration feedback message from the slice selection network element, and determines, based on the network slice configuration feedback message, that the network slice handover for the terminal device in the original network slice fails. Optionally, the application server may further execute some countermeasures based on the cause value. For example, when the cause value indicates that the reason why the network slice handover fails is that the utilization of the target network slice is greater than the threshold, the application server may modify the network slice handover policy, so that some terminal devices in the original network element slice are handed over to the target network slice. For example, the application server sends the policy modification request message to the slice selection network element, where the policy modification request message carries a modified network slice handover policy. Correspondingly, the slice selection network element receives the policy modification request message from the application server, and then replaces the original network slice handover policy with the network slice handover policy carried in the policy modification request message. Alternatively, the application server may further include the identifier of the network slice handover policy and modification indication information in the policy modification request message. The modification indication information indicates to modify the network slice handover policy. The slice selection network element may modify the local network slice handover policy based on the modification indication information.

Based on the foregoing solution, the slice selection network element may determine, based on the resource information of the original network slice and the network slice handover policy, whether to perform the network slice handover for the terminal device in the original network slice, to ensure service experience of post-network slice handover of the terminal device.

Figure 7:
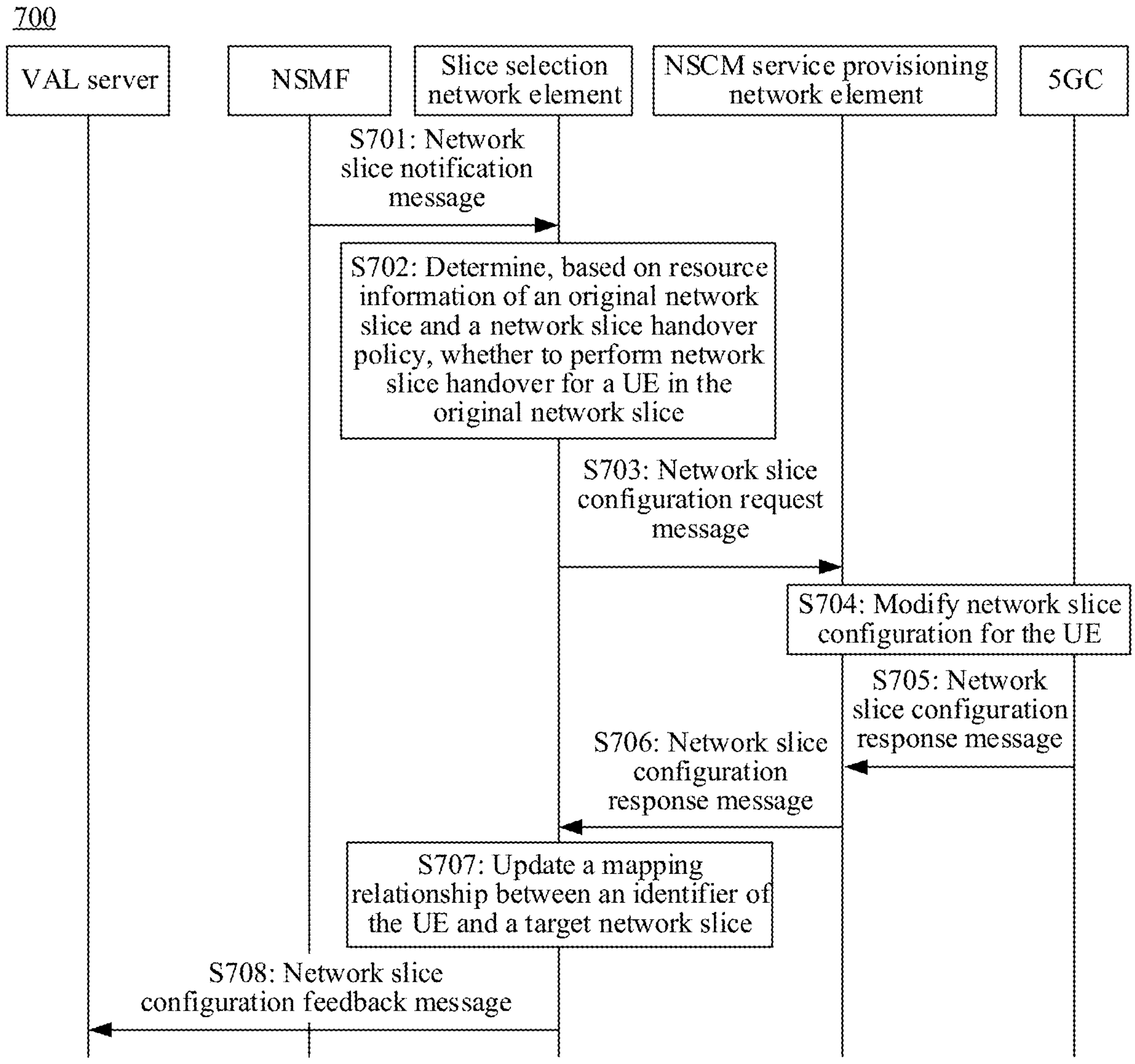
FIG. 7 is a schematic flowchart of another network slice handover method.

The method 600 in FIG. 6 describes the network slice handover method according to this embodiment of this application. The following describes, based on a 5G architecture and with reference to the method 700 in FIG. 7, a preferred embodiment that is provided in this application and that is applied to the 5G architecture. The method 700 includes the following steps.

S701: An NSMF sends a network slice notification message to a slice selection network element.

For example, the NSMF sends the network slice notification message to the slice selection network element, where the network slice notification message includes resource information of an original network slice, the network slice notification message includes an identifier of the original network slice, and the resource information of the original network slice may include one or more of the following information: a network slice key performance indicator (KPI), a network slice alarm, and a network slice analysis report.

TABLE 2

| Number | Notification type | Content |
|---|---|---|
| 1 | Network slice KPI | One or more KPIs of a network slice, for example:<br>a latency (Latency);<br>a throughput (Throughput); and<br>utilization (Utilization). |
| 2 | Network slice alarm | High-priority alarm related to the network slice, for example:<br>a physical resource fault alarm;<br>an NSI alarm; and<br>a network slice alarm. |
| 3 | Network slice analysis report | Network slice report and recommended behavior provided by an NSMF based on analysis, for example:<br>an end to end latency analysis report;<br>a network slice load analysis report;<br>a service experience analysis report; and<br>a KPI anomaly analysis report. |

For ease of description, Table 2 lists three types of information that may be included in the resource information of the original network slice. The following describes each of the three types of information with reference to Table 2.

(1) Network slice KPI (S-NSSAI KPI): The network slice KPI includes one or more performance parameters of the original network slice, for example, a latency, a throughput, and utilization of the original network element slice. The network slice KPI may be used to evaluate performance or resource status of the original network slice.

(2) Network slice alarm (S-NSSAI Alarm): The network slice alarm is alarm information used when the original network slice is faulty or cannot be used, for example, may be a physical resource alarm, a network slice instance (NSI) alarm, or a network slice alarm.

(3) Network slice analysis report: The network slice analysis report may be an analysis report obtained by an MDAS component in the NSMF by analyzing the original network slice, and/or recommended behavior. The network slice analysis report may include, for example, one or more of the following analysis reports: an end to end latency analysis report, a network slice load analysis (Network slice load analysis for S-NSSAI) report, a service experience analysis report, a KPI anomaly analysis report, and the like.

S702: The slice selection network element determines, based on the resource information of the original network slice and a network slice handover policy, whether to perform network slice handover for a UE in the original network slice.

For example, the slice selection network element receives the network slice notification message from the NSMF, and then determines, based on the resource information of the original network slice in the network slice notification message and the network slice handover policy, whether to perform the network slice handover for the UE in the original network slice, or determines whether to hand over the UE in the original network slice to a target network slice.

The network slice handover policy is used by the slice selection network element for automatic network slice handover. In other words, the network slice handover policy is used by the slice selection network element to determine whether to perform the network slice handover for the UE in the original network slice. In other words, the network slice handover policy is used by the slice selection network element to determine whether to hand over the UE in the network slice to the target network slice.

It should be understood that the network slice handover policy may be created by a vertical industry or a network operator and preconfigured for the slice selection network element, or may be initially preconfigured in the slice selection network element. This is not limited in this application.

Table 3 lists content that may be included in the network slice handover policy.

TABLE 3

| Field | Description | Status |
|---|---|---|
| Policy ID | Policy identifier. | Mandatory |
| Condition | Trigger condition for network slice handover, for example:<br>a network slice KPI exceeds a preset threshold;<br>high-priority alarm information is received; and<br>a network slice analysis report meets a preset condition. | Mandatory |
| Original network slice identifier | Identifier of a current network slice of a VAL UE. | Mandatory |
| List of target network slice identifiers | Identifiers of backup network slices to which a UE may be handed over when the trigger condition for network slice handover is met. | Mandatory |
| Target DNN | DNN of a backup data network to which the UE may be handed over when the trigger condition for network slice handover is met. | Optional |
| List of VAL UE IDs | List of identifiers of VAL UEs subject to the network slice handover. | Mandatory |
| VAL service ID | Identifier of a service subject to the network slice handover. | Mandatory |

It can be learned from Table 3 that the network slice handover policy includes a policy TD (Policy ID), and the policy ID identifies the network slice handover policy, or the policy ID distinguishes between different network slice handover policies.

The network slice handover policy further includes condition, indicating the trigger condition for network slice handover for the UE, or this field indicates the trigger condition for handing over the UE to the target network slice. The trigger condition may include, for example, one or more of the following:

(1) The network slice KPI exceeds a preset threshold. The network slice KPI may be any one or more network slice KPIs, for example, a latency, a throughput, or utilization of a network slice. For example, the latency of the network slice is greater than or equal to 100 ins, and/or a maximum quantity of network slice connections is greater than or equal to 1000.

(2) The slice selection network element receives a high-priority alarm, or the resource information of the original network slice includes the high-priority alarm. The high-priority alarm may be, for example, a network element fault alarm or a network element power-off alarm.

(3) The network slice analysis report meets a preset condition. For example, the network slice analysis report predicts that network resource usage in a time segment may exceed a threshold.

(4) The slice selection network element receives the alarm information and/or the KPI of the original network slice. In other words, the resource information of the original network slice includes the alarm information or the KPI.

When one or more of the foregoing trigger conditions are met, the UE in the original network slice may be handed over to the target network slice.

The network slice handover policy may further include the identifier of the original network slice. The identifier of the original network slice is associated with the network slice handover policy, or the network slice handover policy is used for the UE in the original network slice, or the network slice handover policy indicates the UE in the original network slice to perform the network slice handover. The identifier of the original network slice may include an identifier of one or more network slices.

The network slice handover policy may further include an identifier of the target network slice, that is, an identifier of a network slice to which the UE is to be handed over, or an identifier of a backup network slice. When the foregoing trigger condition for network slice handover is met, the UE in the network slice may be handed over to the target network slice.

Optionally, the network slice handover policy may further include the target DNN, that is, the name of a data network to which the UE is to be handed over. When the foregoing trigger condition for network slice handover is met, the UE in the network slice may be handed over to the data network corresponding to the target DNN.

The network slice handover policy may further include the list of VAL UE IDs, that is, a list of identifiers of VAL UEs in the original network slice, or a list of identifiers of VAL UEs subject to the network slice handover. It should be understood that the list of VAL UE IDs may include identifiers of all UEs in the original network slice, or may include only identifiers of some UEs in the original network slice. This is not limited in this application. The list of VAL UE IDs may include identifiers of one or more UEs. When the foregoing trigger condition for network slice handover is met, the UE in the list of VAL UE IDs may be handed over to the target network slice.

The network slice handover policy may further include the VAL service ID, that is, an identifier of a service (or an application) corresponding to the original network slice, or an identifier of a service (or an application) subject to the network slice handover. When the foregoing trigger condition for network slice handover is met, the network slice handover for the VAL UE corresponding to the identifier of the service (or the identifier of the application) may be performed.

It should be understood that, in an implementation, the network slice handover policy may include either of the list of VAL UE IDs and the VAL service ID, or may include both of the list of VAL UE IDs and the VAL service ID. This is not limited in this application.

In S702, after obtaining resource information of a network slice via the network slice notification message, the slice selection network element determines, with reference to the network slice handover policy, whether to hand over the UE (that is, a UE corresponding to the list of VAL UE IDs) in the original network slice to the target network element slice, or determines whether to perform the network slice handover for the UE in the network slice. In a possible implementation, when the resource information of the original network slice meets the trigger condition for network slice handover, the UE in the original network slice may be handed over to the target network slice. Descriptions are provided below by using examples.

For example, the slice selection network element receives the network slice notification message from the NSMF, where the network slice notification message includes an identifier of the network slice, the network slice KPI, and the network slice alarm. A latency of the network slice KPI is 90 ms, and the network slice alarm is a physical resource alarm, with an identifier indicating a high-priority alarm. A slice management network element preconfigures the network slice handover policy. In the network slice handover policy, the trigger condition for network slice handover is that the latency of the network slice is greater than 100 ms, and/or high-priority alarm information is received. In this case, because the network slice notification message carries the high priority physical resource alarm information, the slice selection network element hands over the VAL UE (or the UE corresponding to the VAL service ID) in the list of VAL UE IDs to the target network slice.

For another example, the slice selection network element receives the network slice notification message from the NSMF, where the network slice notification message includes the identifier of the original network slice and the network slice analysis report, the network slice analysis report includes the network slice load analysis report, and the network slice load analysis report shows that a load of the original network slice is greater than a threshold in the next 10 minutes. The slice management network element preconfigures the network slice handover policy. In the network slice handover policy, the trigger condition for network slice handover is that the network slice analysis report meets the preset condition, and the preset condition is that the load of the network slice in a time segment is greater than a threshold. In this case, because the network slice analysis report in the network slice notification message meets the trigger condition for network slice handover, the slice selection network element hands over the VAL UE (or the UE corresponding to the VAL service ID) in the list of VAL UE IDs to the target network slice.

Optionally, when the resource information of the original network slice meets the trigger condition, the slice selection network element may further determine whether the target network slice meets the trigger condition for network slice handover. When the resource information of the target network slice does not meet the trigger condition for network slice handover, the slice selection network element hands over the UE in the original network slice to the target network slice. Optionally, the slice selection network element may obtain the resource information of the target network slice by using the NSMF. A specific manner is not limited in this application.

S703: The slice selection network element sends a network slice configuration request message to an NSCM service provisioning network element.

For example, when determining to hand over the UE in the original network slice to the target network slice, the slice selection network element sends the network slice configuration request message to the NSCM service provisioning network element, where the network slice configuration request message includes the identifier of the target network slice and the list of VAL UE IDs or the VAL service ID, and the network slice configuration request message is used to request to configure the target network slice for the UE corresponding to the list of VAL UE IDs or the VAL service ID.

S704: The NSCM service provisioning network element modifies network slice configuration for the UE by using a 5GC.

For example, after receiving the network slice configuration request message from the slice selection network element, the NSCM service provisioning network element modifies, by invoking a core network interface (which may be an existing 3GPP interface), the network slice configuration for the UE corresponding to the list of VAL UE IDs or the VAL service ID. For a specific process, refer to related content in an existing protocol. This is not limited in this application.

S705: The 5GC sends a network slice configuration response message to the NSCM service provisioning network element.

S706: The NSCM service provisioning network element sends the network slice configuration response message to the slice selection network element.

For example, after modifying the network slice configuration, the 5GC sends the network slice configuration response message to the NSCM. The network slice configuration response message may indicate whether the network slice configuration is successfully modified. After receiving the network slice configuration response message, the NSCM service provisioning network element sends the network slice configuration response message to the slice selection network element.

S707: The slice selection network element updates a mapping relationship between the UE and the target network slice.

For example, in a possible implementation, the slice selection network element receives the network slice configuration response message from the NSCM service provisioning network element. If the network slice configuration response message indicates that the network slice configuration for the UE is successfully modified, the slice selection network element updates the mapping relationship between the UE and the target network slice. The mapping relationship may be an association relationship between an identifier of the UE (VAL UE ID) and the identifier of the target network slice. It should be understood that, that the slice selection network element updates the mapping relationship between the UE and the target network slice herein may mean associating the identifier of the VAL UE with the identifier of the target network slice, or updating an association relationship between the identifier of the UE and the identifier of the original network slice to the association relationship between the identifier of the UE and the identifier of the target network slice.

In another possible implementation, the slice selection network element receives the network slice configuration response message from the NSCM service provisioning network element. If the network slice configuration response message indicates that the network slice configuration for a VAL service (or a UE corresponding to the VAL service) is successfully modified, the slice selection network element updates a mapping relationship between the VAL service and the target network slice. The mapping relationship may be an association relationship between the VAL service ID and the identifier of the target network slice.

S708: The slice selection network element sends a network slice configuration feedback message to a VAL server.

For example, after updating the mapping relationship between the VAL UE (or the VAL service) and the identifier of the target network slice, the slice selection network element sends the network slice configuration feedback message to the VAL server. The network slice configuration feedback message includes the identifier of the UE (or the VAL service ID) and the identifier of the target network slice.

Therefore, in the foregoing solution, the slice selection network element may determine, based on the resource information of the network slice and the network slice handover policy, whether to perform the network slice handover for the UE, or may determine whether to hand over the UE to the target network slice, or determine the target network slice to which the UE is to be handed over, to implement a capability of automatic network slice handover.

In addition, when performing the network slice handover for the UE, the slice selection network element considers the resource information of the network slice, to ensure post-network slice handover service reliability and availability of a vertical industry.

Figure 8:
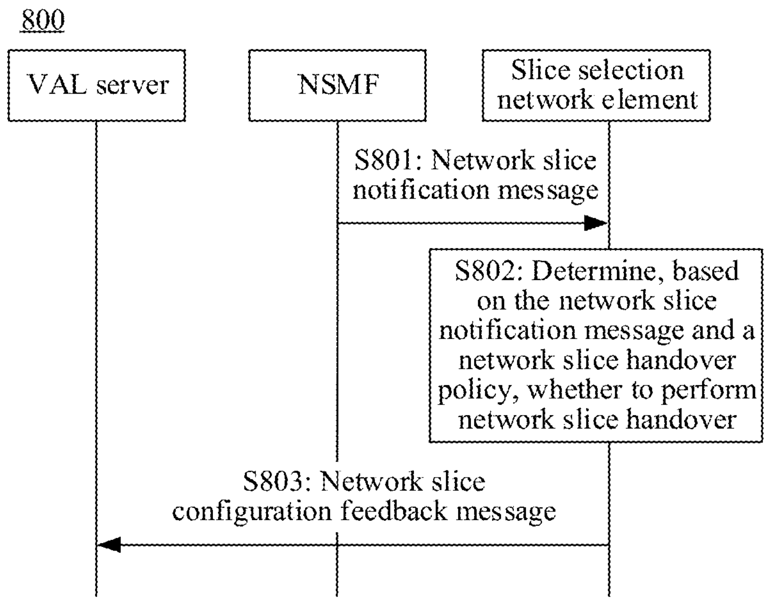
FIG. 8 is a schematic flowchart of still another network slice handover method.

In the method 700, when the slice selection network element determines to hand over a terminal device in the original network slice to the target network slice, the slice selection network element requests the NSCM service provisioning network element to perform the network slice configuration for the terminal device in the original network slice. However, if the slice selection network element does not hand over the terminal device in the original network slice to the target network slice because the target network slice does not meet a handover condition (for example, the resource information of the target network slice meets the trigger condition for network slice handover), service experience of the terminal device may be compromised. In view of this, FIG. 8 shows an example flowchart of a network slice handover method 800 according to this embodiment of this application. In the method 800, when a slice selection network element notifies a VAL server that network slice handover for a terminal device in an original network slice fails, the VAL server may formulate a response policy to ensure service experience of the terminal device. It should be understood that the method 800 may be independently implemented, or may be implemented in combination with the method 700. This is not limited in this application. The method 800 includes the following steps.

S801: An NSMF sends a network slice notification message to the slice selection network element.

It should be understood that S801 is similar to S701 in the method 700. For brevity, details are not described again.

S802: The slice selection network element determines, based on resource information of the original network slice and a network slice handover policy, whether to perform the network slice handover for a UE in the original network slice.

For example, after receiving the resource information of the network slice via the network slice notification message, the slice selection network element determines, with reference to the network slice handover policy, whether to perform the network slice handover for the UE in the original network slice. For related descriptions of the network slice handover policy, refer to S702 in the method 700. Details are not described herein again.

S803: The slice selection network element sends a network slice configuration feedback message to the VAL server.

For example, when the UE in the original network slice fails to be handed over to a target network slice because, for example, resource information of the target network slice meets a trigger condition for network slice handover, or the target network slice does not meet a handover requirement, making it impossible for the UE in the original network slice to be handed over to the target network slice, the slice selection network element sends the network slice configuration feedback message to the VAL server, where the network slice configuration feedback message indicates that the network slice handover for the UE in the original network slice fails, or the network slice configuration feedback message indicates that the UE in the original network slice fails to be handed over to the target network slice. It should be understood that the trigger condition for network slice handover used to determine the resource information of the target network slice may be the same as the trigger condition for network slice handover used to determine the resource information of the original network slice. In other words, only one trigger condition for network slice handover may be configured in the network slice handover policy. Optionally, the network slice configuration feedback message may further include a cause of network slice handover failure and/or recommended behavior.

For ease of description, Table 4 lists content that may be included in the network slice configuration feedback message.

TABLE 4

| Field | Description | Status |
|---|---|---|
| Network slice handover result | Failure | Mandatory |
| Failure cause value | Specific cause of the network slice handover failure, for example:<br>a target network slice is overloaded; and<br>the target network slice cannot meet service requirements of all UEs. | Optional |
| Recommended behavior | Recommended subsequent behavior that can be performed by a vertical industry server, for example:<br>modifying a target network slice order (upgrading target network slice configuration); and<br>modifying a target network slice selection policy. | Optional |

The following describes the foregoing several types of information with reference to Table 4.

The network slice configuration feedback message includes the network slice handover result, and the network slice handover result indicates that the network slice handover fails.

Optionally, the network slice configuration feedback message includes the failure cause value, and the failure cause value indicates the specific cause of the network slice handover failure. For example, the failure cause value is that the target network slice is overloaded. For another example, the failure cause value is that the target network slice cannot meet the service requirements of all UEs in the original network slice because a quantity of UEs in the original network slice is excessively large (or a performance requirement is excessively high).

Optionally, the network slice configuration feedback message may further indicate the recommended behavior, that is, the recommended subsequent behavior that can be performed by the vertical industry server. For example, the recommended behavior is modifying the target network slice order (or upgrading the target network slice configuration). For another example, the recommended behavior is modifying the network slice handover policy, for example, grouping UEs to be handed over, and handing over some UEs (for example, 60%) to the target network slice.

Correspondingly, the VAL server receives the network slice configuration feedback message from the slice selection network element. The VAL server may formulate a subsequent policy based on the network slice configuration feedback message. For example, the network slice configuration feedback message carries a cause value, and the cause value indicates that a handover failure cause is that the target network slice is overloaded. In this case, the VAL server may add one or more target network element slices (or replace the original target network slice) to the network slice handover policy by modifying the network slice handover policy. For another example, the network slice configuration feedback message carries a cause value, and the cause value indicates that the handover failure cause is that the target network slice cannot meet the service requirements of all UEs in the original network slice. In this case, the VAL server may modify a list of VAL UE IDs in the network slice handover policy by modifying the network slice handover policy (for example, retaining identifiers of only 60% of the UEs).

Therefore, in the foregoing solution, if the network slice handover fails, or if the target network slice cannot meet a network slice handover requirement, the slice selection network element may notify the VAL server of the result, and may further notify the VAL server of the failure cause and the recommended behavior, so that the VAL server may re-formulate a network slice handover policy.

Figure 9:
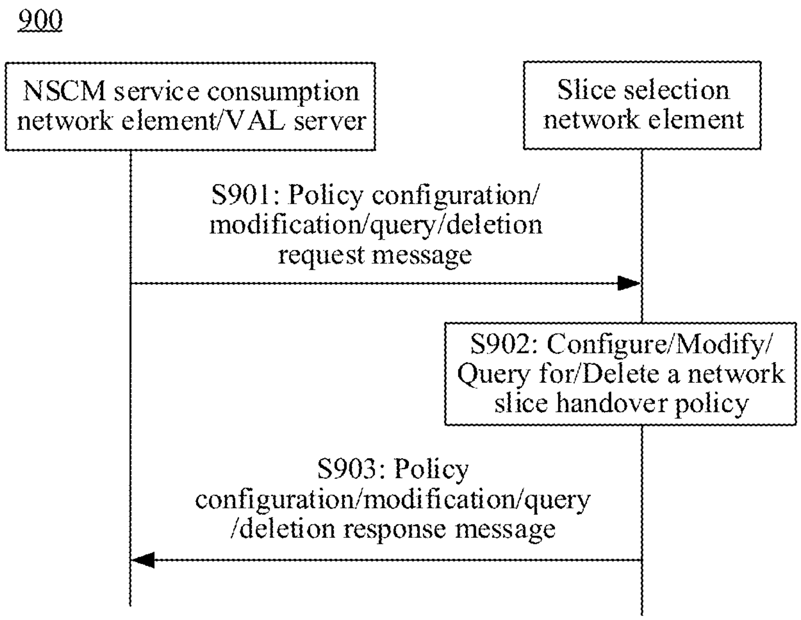
FIG. 9 is a schematic flowchart of still another network slice handover method.

FIG. 9 is an example flowchart of a network slice handover method 900 according to this embodiment of this application. It should be understood that the method 900 may be independently implemented, or may be implemented in combination with the method 700 or the method 800. This is not limited in this application. The method 900 may include the following steps.

S901: An NSCM service consumption network element/a VAL server sends a policy configuration/modification/query/deletion request message to a slice selection network element.

In an example solution, the NSCM service consumption network element or the VAL server sends the policy configuration request message (or may be referred to as a policy creation request message, which is not limited herein) to the slice selection network element. The policy configuration request message includes a network slice handover policy, and the policy configuration request message is used to configure the network slice handover policy. The network slice handover policy may be a policy used to determine whether to perform network slice handover for a UE. This is not limited in this embodiment. For example, the network slice handover policy is similar to the network slice handover policy described in S702 in the method 700. Details are not described herein again.

In another example solution, the NSCM service consumption network element or the VAL server sends the policy modification request message to the slice selection network element, where the policy modification request message includes an identifier of a network slice handover policy and policy modification information, and the policy modification request message is used to request to modify or update the network slice handover policy. The policy modification information may be a modified network slice handover policy. In this case, the slice selection network element may directly replace the original network slice handover policy with the modified network slice handover policy. Alternatively, the policy modification information may indicate specific modification content, for example, indicate to modify a trigger condition for network slice handover in the original network slice handover policy or an identifier of an original network slice.

In still another example solution, the NSCM service consumption network element or the VAL server sends the policy query request message to the slice selection network element, where the policy query request message includes an identifier of a network slice handover policy, and the policy query request message is used to request to query for or obtain the network slice handover policy.

In still another example solution, the NSCM service consumption network element or the VAL server sends a network slice handover policy deletion request message to the slice selection network element, where the network slice handover policy deletion request message includes an identifier of a network slice handover policy, and the network slice handover policy deletion request message is used to request to delete the network slice handover policy.

S902: The slice selection network element configures/modifies/queries for/deletes the network slice handover policy.

In an example solution, the slice selection network element receives the policy configuration request message from the NSCM service consumption network element/the VAL server, where the policy configuration request message includes the network slice handover policy, and the slice selection network element locally configures the network slice handover policy. It should be understood that, that the slice selection network element locally configures the network slice handover policy means that the slice selection network element locally creates the network slice handover policy, or locally stores the network slice handover policy.

In another example solution, the slice selection network element receives the policy modification request message from the NSCM service consumption network element/the VAL server, where the policy modification request message includes the identifier of the network slice handover policy and the policy modification information. If the policy modification information indicates specific modification content, the slice selection network element may obtain the network slice handover policy based on the identifier of the network slice handover policy, and modify the network slice handover policy based on the policy modification information. If the policy modification information is the modified network slice handover policy, the slice selection network element directly replaces the original network slice handover policy with the modified network slice handover policy.

In still another example solution, the slice selection network element receives the policy query request message from the NSCM service consumption network element/the VAL server, where the policy query request message includes the identifier of the network slice handover policy. The slice selection network element locally searches for the network slice handover policy based on the identifier of the policy. If the network slice handover policy is found, the slice selection network element sends the network slice handover policy to the NSCM service consumption network element/the VAL server via a network slice query response message.

In still another example solution, the slice selection network element receives the policy deletion request message from the NSCM service consumption network element/the VAL server, where the policy deletion request message includes the identifier of the network slice handover policy. The slice selection network element deletes the network slice handover policy from local storage based on the policy deletion request message.

S903: The slice selection network element sends a policy configuration/modification/query/deletion response message to the NSCM service consumption network element/the VAL server.

For example, after S902 is performed, the slice selection network element sends the policy configuration/modification/query/deletion response message to the NSCM service consumption network element/the VAL server, where the policy configuration/modification/query/deletion response message includes indication information indicating whether an operation is successful or fails. However, it should be noted that, for the network slice handover policy query response message, the response message may further carry the network slice handover policy found by the slice selection network element through query.

Therefore, in the foregoing solution, an interface for configuring/modifying/querying for/deleting the network slice handover policy is defined, or a capability of the NSCM service consumption network element/the VAL server to configure/modify/query for/delete the network slice handover policy is defined, so that the NSCM service consumption network element/the VAL server may perform a network slice handover policy configuration/modification/query/deletion operation through the slice selection network element.

Figure 10:
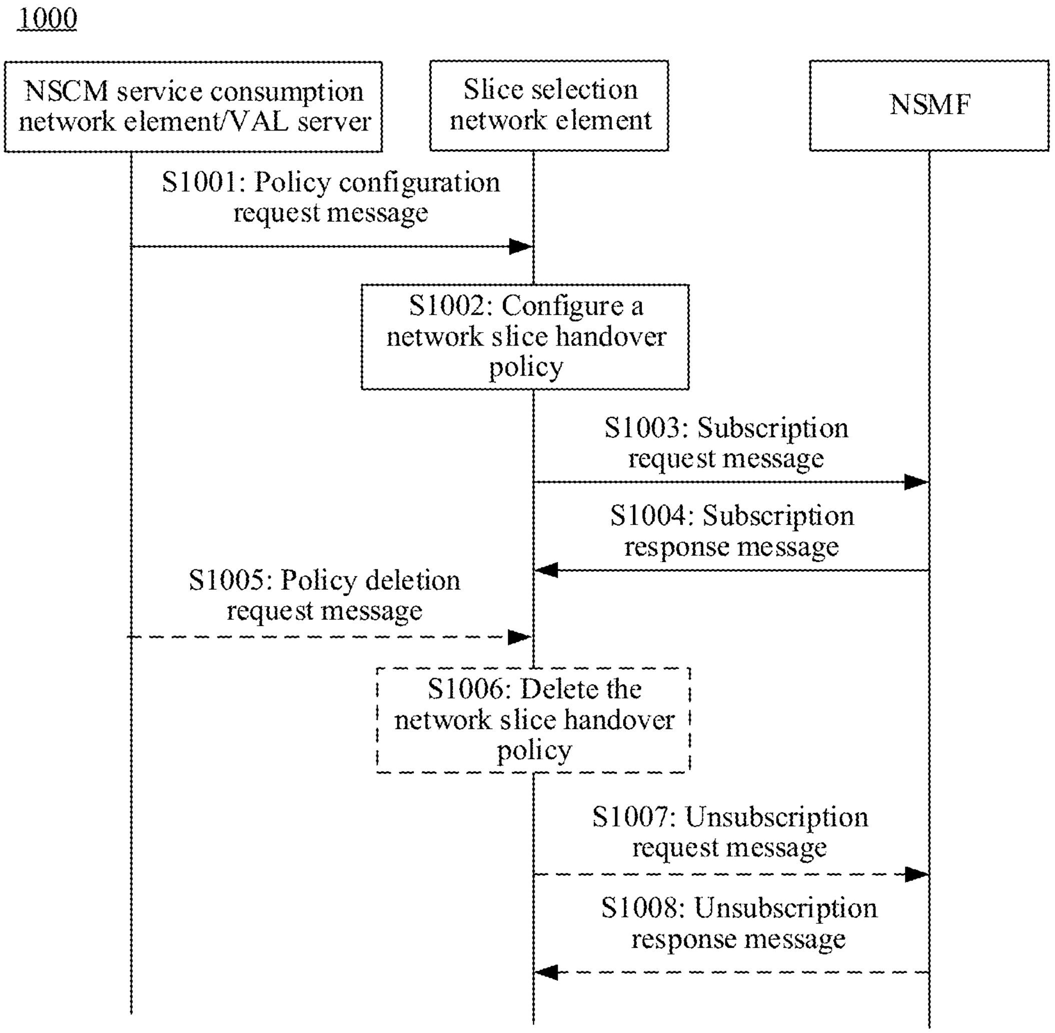
FIG. 10 is a schematic flowchart of still another network slice handover method.

FIG. 10 is an example flowchart of a network slice handover method 1000 according to this embodiment of this application. The method 1000 includes the following steps.

S1001: An NSCM service consumption network element/a VAL server sends a policy configuration request message to a slice selection network element.

S1002: The slice selection network element configures a network slice handover policy.

It should be understood that S1001 and S1002 are similar to a network slice handover policy configuration process in S901 and S902 in the method 900. Details are not described herein again.

S1003: The slice selection network element sends a subscription request message to an NSMF.

For example, after creating the network slice handover policy, the slice selection network element may send the subscription request message to the NSMF, where the subscription request message includes an identifier of an original network slice, the subscription request message is used to request to subscribe to resource information of the original network slice, and the resource information may include one or more of the following information: a network slice alarm, a network slice key performance indicator, and a network slice analysis report. The slice selection network element may include information in the subscription request message to indicate a subscription type of the slice selection network element. For example, the slice selection network element indicates, in the subscription request message, to subscribe to the network slice alarm. Alternatively, a default manner may be used. For example, if the slice selection network element does not indicate the subscription type in the subscription request message, the network slice alarm is subscribed to by default.

The following illustrates specific implementations in which the slice selection network element subscribes to the three types of the resource information of the network slice.

(1) Network Slice Alarm Subscription:

The slice selection network element may subscribe to the network slice alarm from the NSMF. When an alarm (or a high-priority alarm) occurs in the original network slice, the NSMF sends alarm information to the slice selection network element. The alarm status herein may include the network slice alarm, an NSI alarm, or the like.

Optionally, the slice selection network element may indicate an alarm condition. For example, the slice selection network element adds indication information of the alarm condition to the subscription request message. For example, when a network slice is powered off, an alarm is triggered.

(2) Network Slice Key Performance Indicator Subscription:

The slice selection network element may subscribe to the network slice KPI from the NSMF. The network slice KPI may include a latency, a throughput, utilization, and the like of the original network slice.

Optionally, the slice selection network element may indicate, to the NSMF, a condition for reporting the network slice KPI. For example, the slice selection network element adds a KPI threshold, for example, a latency threshold, to the subscription request message. When a latency of the original network slice is greater than or equal to the latency threshold, the NSMF reports the latency of the original network slice to the slice selection network element. In this implementation, the network slice KPI reported by the NSMF to the network slice selection network element may also be considered as alarm information (a KPI alarm). When the slice selection network element receives the network slice KPI and a target network slice also meets a requirement, a UE in the original network slice may be handed over to the target network slice.

Optionally, the slice selection network element may indicate, to the NSMF, a time interval for reporting the network slice KPI. For example, the slice selection network element indicates, in the subscription request message, the NSMF to proactively report the latency of the original network slice every 10 minutes. In this implementation, when receiving the network slice KPI from the NSMF, the slice selection network element may determine, according to the network slice handover policy, whether the network slice KPI meets the network slice handover policy.

(3) Network Slice Analysis Report Subscription:

The slice selection network element may subscribe to the network slice analysis report from the NSMF. The network slice analysis report herein may include an NSMF report on a network slice and recommended behavior. After making an analysis report for the original network slice according to a policy of an operator or another condition, the NSMF needs to report a network slice analysis report of the original network slice to the slice selection network element.

Optionally, the slice selection network element may indicate, to the NSMF, a time interval for reporting the network slice analysis report. For example, the slice selection network element indicates, in the subscription request message, the NSMF to proactively report the analysis report for the original network slice every 10 minutes. In this implementation, when receiving the network slice analysis report from the NSMF, the slice selection network element may determine, according to the network slice handover policy, whether the network slice analysis report meets the network slice handover policy.

Optionally, the subscription request message may further include an identifier of the target network slice. In other words, the slice selection network element may request, via the subscription request message, to subscribe to resource information of the target network slice. A specific manner may be similar to the foregoing manner of subscribing to the resource information of the original network slice. Details are not described herein again.

S1004: The NSMF sends a subscription response message to the slice selection network element.

For example, after receiving the subscription request message from the slice selection network element, the NSMF may send the subscription response message to the slice selection network element. The subscription response message indicates that subscription is successful.

Optionally, after S1004, if the NSCM service consumption network element/the VAL server indicates the slice selection network element to modify or update the network slice handover policy, the slice selection network element may re-subscribe to the resource information of the original network slice and/or the target network slice from the NSMF.

For example, the slice selection network element receives a policy modification request message from the NSCM service consumption network element/the VAL server. The policy modification request message includes the network slice handover policy and policy modification information, and the policy modification information indicates to modify an identifier of the original network slice in the original network slice handover policy (for example, modify the identifier of the original network slice from "UE 1, UE 2, and UE 3" to "UE 1"). The slice selection network element sends the subscription request message to the NSMF based on the policy modification request message, where the subscription request message includes a modified identifier of the original network slice, and the subscription request message is used to request to subscribe to the resource information of the modified original network slice.

Optionally, S1005: The slice selection network element receives a network policy deletion request message from the NSCM service consumption network element/the VAL server.

Optionally, S1006: The slice selection network element deletes the network slice handover policy.

It should be understood that S1005 and S1006 are similar to a network slice handover policy deletion process in S901 and S902 in the method 900. Details are not described herein again.

Optionally, S1007: The slice selection network element sends an unsubscription request message to the NSMF.

For example, after receiving the network slice handover policy deletion request message from the NSCM service consumption network element/the VAL server, the slice selection network element may send the unsubscription request message to the NSMF. The unsubscription request message is used to unsubscribe from the resource information of the original network slice (optionally, the unsubscription request message may further be used to unsubscribe from the resource information of the target network slice).

Optionally, S1008: The NSMF sends an unsubscription response message to the slice selection network element.

For example, after receiving the unsubscription request message from the slice selection network element, the NSMF may send the unsubscription response message to the slice selection network element. The unsubscription response message indicates that unsubscription is successful.

Therefore, in the foregoing solution, the slice selection network element may first subscribe to the resource information of the original network slice from the NSMF, so that the slice selection network element may determine, based on the resource information of the original network slice, whether the UE in the original network slice may be handed over to the target network slice, to ensure service experience of post-network slice handover of the UE.

Corresponding to the methods provided in the foregoing method embodiments, an embodiment of this application further provides a corresponding apparatus. The apparatus includes a corresponding module configured to perform the foregoing method embodiments. The module may be software, hardware, or a combination of software and hardware. It may be understood that the technical features described in the method embodiments are also applicable to the following apparatus embodiments.

Figure 11:
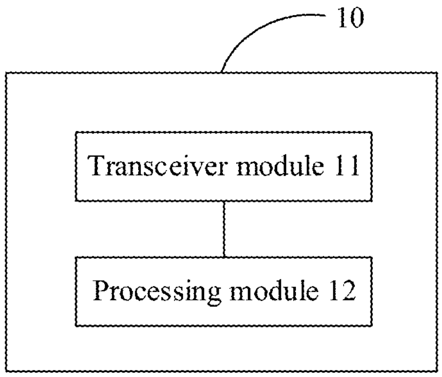
FIG. 11 is a schematic block diagram of an apparatus according to an embodiment of this application.

FIG. 11 is a schematic block diagram of a network slice handover apparatus according to an embodiment of this application. The apparatus 10 includes a transceiver module 11 and a processing module 12. The transceiver module 11 may be configured to implement a corresponding communication function. The transceiver module 11 may also be referred to as a communication interface or a communication unit. The processing module 12 may be configured to implement a corresponding processing function.

Optionally, the apparatus 10 may further include a storage module. The storage module may be configured to store instructions and/or data. The processing module 12 may read the instructions and/or the data in the storage module, so that the apparatus implements actions of the device or the network element in each of the foregoing method embodiments.

In a design, the apparatus 10 may be the slice selection network element in the foregoing embodiment, or may be a component (for example, a chip) of the slice selection network element. The apparatus 10 may implement steps or processes performed by the slice selection network element in the foregoing method embodiment. The transceiver module 11 may be configured to perform receiving and sending related operations of the slice selection network element in the foregoing method embodiment. The processing module 12 may be configured to perform processing related operations of the slice selection network element in the foregoing method embodiment.

In a first possible implementation, the transceiver module 11 is configured to receive resource information of an original network slice from a network slice management function network element, where the resource information of the original network slice includes one or more of the following information: a performance indicator of the original network slice, alarm information of the original network slice, and an analysis report for the original network slice. The processing module 12 is configured to determine, based on the resource information of the original network slice and a network slice handover policy, whether to hand over a terminal device in the original network slice to a target network slice, where the network slice handover policy includes a trigger condition for network slice handover, an identifier of the target network slice, an identifier of the original network slice, and an identifier and/or an application identifier of the terminal device in the original network slice.

Optionally, the processing module 12 may be specifically configured to determine whether the resource information of the network slice meets the trigger condition for network slice handover. If the resource information of the network slice meets the trigger condition for network slice handover, the processing module 12 determines to hand over the terminal device in the network slice to the target network slice.

Optionally, the transceiver module 11 is further configured to receive resource information of a target network slice from the network slice management function network element; and the processing module 12 is further configured to determine that the resource information of the target network slice does not meet the trigger condition.

Optionally, the trigger condition for network slice handover includes one or more of the following: The performance indicator of the network slice is greater than or equal to a first threshold, or is less than or equal to a second threshold. The slice selection network element receives the alarm information of the network slice and/or the performance indicator of the network slice. The slice selection network element receives the alarm information of the original network slice, where the alarm information is high-priority alarm information. The analysis report for the network slice meets a handover condition.

Optionally, the transceiver module 11 is further configured to send a subscription request message to the network slice management function network element, where the subscription request message includes the identifier of the original network slice, and the subscription request message is used to subscribe to the resource information of the original network slice.

Optionally, the transceiver module 11 is further configured to send a network slice configuration request message to a network slice capability management service provisioning network element, where the network slice configuration request message includes the identifier of the target network slice, and the identifier and/or the application identifier of the terminal device in the original network slice, and the network slice configuration request message is used to request to configure the target network slice for the terminal device in the network slice.

Optionally, the transceiver module 11 is further configured to receive a network slice configuration response message from the network slice capability management service provisioning network element, where the network slice configuration response message indicates that the target network slice is successfully configured for the terminal device; and send a network slice configuration feedback message to an application server, where the network slice configuration feedback message includes the identifier of the target network slice and the identifier of the terminal device in the original network slice.

Optionally, the processing module 12 is further configured to locally update an association relationship between the identifier of the target network slice and the identifier of the terminal device.

Optionally, the transceiver module 11 is further configured to send the network slice configuration feedback message to the application server, where the network slice configuration feedback message includes the identifier of the original network slice, and the network slice configuration feedback message indicates that the network slice handover for the terminal device in the original network slice fails.

Optionally, the network configuration feedback message further includes a cause value and/or recommended behavior indication information, where the cause value indicates a reason why the terminal device in the original network slice is not handed over to the target network slice, and the recommended behavior indication information indicates an operation to be performed by the application server.

Optionally, the transceiver module 11 is further configured to receive a policy configuration request message from a network slice capability management service consumption network element or the application server, where the policy configuration request message includes the network slice handover policy. The processing module 12 is further configured to store the network slice handover policy.

Optionally, the transceiver module 11 is further configured to receive a policy modification request message from the network slice capability management service consumption network element or the application server, where the policy modification request message includes policy modification information, and the policy modification information indicates modification performed on the network slice handover policy. The processing module 12 is further configured to modify the network slice handover policy based on the policy modification information.

Optionally, the transceiver module 11 is further configured to receive a policy deletion request message from the network slice capability management service consumption network element or the application server, where the policy deletion request message includes an identifier of the network slice handover policy, and the policy deletion request message indicates to delete the network slice handover policy. The processing module 12 is further configured to delete the network slice handover policy.

It should be understood that a specific process in which the modules perform the foregoing corresponding steps is described in detail in the foregoing method embodiments. For brevity, details are not described herein again.

It should also be understood that the apparatus 10 herein is presented in a form of a functional module. The term "module" herein may be an application-specific integrated circuit (ASIC), an electronic circuit, a processor (for example, a shared processor, a dedicated processor, or a group processor) configured to execute one or more software or firmware programs, a memory, a combinational logic circuit, and/or another appropriate component that supports the described function. In an optional example, a person skilled in the art may understand that the apparatus 10 may be specifically the slice selection network element in the foregoing embodiments, and may be configured to perform processes and/or steps corresponding to the slice selection network element in the foregoing method embodiments. To avoid repetition, details are not described herein again.

The apparatus 10 in each of the foregoing solutions has a function of implementing corresponding steps performed by the slice selection network element in the foregoing method. The function may be implemented by hardware, or may be implemented by hardware executing corresponding software. The hardware or software includes one or more modules corresponding to the foregoing function. For example, a transceiver module may be replaced with a transceiver (for example, a sending unit in the transceiver module may be replaced with a transmitter, and a receiving unit in the transceiver module may be replaced with a receiver), and another unit such as a processing module may be replaced with a processor, to respectively perform sending and receiving operations and a related processing operation in the method embodiments.

In addition, the transceiver module 11 may alternatively be a transceiver circuit (for example, the transceiver circuit may include a receiver circuit and a transmitter circuit), and the processing module may be a processing circuit.

It should be noted that the apparatus in FIG. 11 may be the network element or the device in the foregoing embodiments, or may be a chip or a chip system, for example, a system-on-a-chip (SoC). The transceiver module may be an input/output circuit or a communication interface. The processing module is a processor, a microprocessor, or an integrated circuit integrated on the chip. This is not limited herein.

Figure 12:
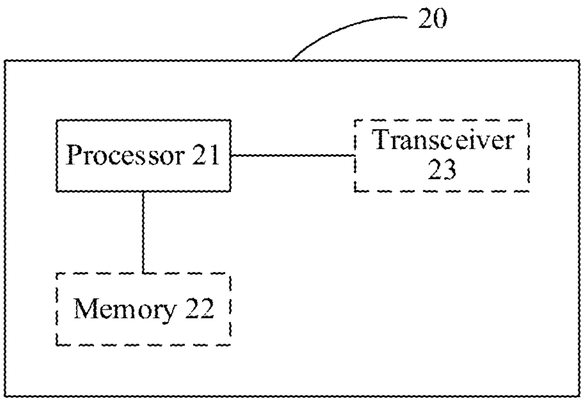
FIG. 12 is another schematic block diagram of an apparatus according to an embodiment of this application.

FIG. 12 shows another network slice handover apparatus 20 according to an embodiment of this application. The apparatus 20 includes a processor 21. The processor 21 is configured to execute a computer program or instructions stored in a memory 22, or read data/signaling stored in the memory 22, to perform the methods in the foregoing method embodiments. Optionally, there are one or more processors 21.

Optionally, as shown in FIG. 12, the apparatus 20 further includes the memory 22, and the memory 22 is configured to store the computer program or the instructions and/or the data. The memory 22 may be integrated with the processor 21, or may be disposed separately. Optionally, there are one or more memories 22.

Optionally, as shown in FIG. 12, the apparatus 20 further includes a transceiver 23, and the transceiver 23 is configured to receive and/or send a signal. For example, the processor 21 is configured to control the transceiver 23 to receive and/or send the signal.

In a solution, the apparatus 20 is configured to implement operations performed by the slice selection network element in the foregoing method embodiments.

For example, the processor 21 is configured to execute the computer program or the instructions stored in the memory 22, to implement related operations of the slice selection network element in the foregoing method embodiments, for example, the method performed by the slice selection network element in any embodiment shown in FIG. 6 to FIG. 9.

It should be understood that, the processor in this embodiment of this application may be a central processing unit (CPU), or may further be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in this embodiment of this application may be a volatile memory and/or a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM). For example, the RAM may be used as an external cache. By way of example, and not limitation, the RAM includes a plurality of forms, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (storage module) may be integrated into the processor.

It should further be noted that the memory described in this specification aims to include but is not limited to these memories and any memory of another proper type.

An embodiment of this application further provides a computer-readable storage medium. The computer-readable storage medium stores computer instructions used to implement the method performed by the core network element in the foregoing method embodiments.

For example, when a computer program is executed by a computer, the computer is enabled to implement the method performed by the slice selection network element in the foregoing method embodiments.

An embodiment of this application further provides a computer program product, including instructions. When the instructions are executed by a computer, the method performed by the slice selection network element in the foregoing method embodiments is implemented.

For explanations and beneficial effects of related content of any one of the apparatuses provided above, refer to the corresponding method embodiment provided above. Details are not described herein again.

In the several embodiments provided in this application, it should be understood that the disclosed apparatus and method may be implemented in other manners. For example, the described apparatus embodiment is merely an example. For example, division into the units is merely logical function division and there may be other division manners in actual implementation. For example, a plurality of units or components may be combined or integrated into another system, or some features may be ignored or not performed. In addition, the displayed or discussed mutual couplings, direct couplings, or communication connections may be implemented through some interfaces. Indirect couplings or communication connections between the apparatuses or units may be implemented in an electronic form, a mechanical form, or another form.

The foregoing embodiments may be wholly or partially implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the processes or functions according to embodiments of this application are wholly or partially generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like. For example, the usable medium may include but is not limited to any medium that can store program code, such as a USB flash drive, a removable hard disk, a read-only memory (ROM), a random access memory (RAM), a magnetic disk, or an optical disc.

The foregoing descriptions are merely specific implementations of this application and are not intended to limit the protection scope of this disclosure. Any variation or replacement readily determined by a person skilled in the art within the technical scope disclosed in this disclosure shall fall within the protection scope of the accompanying claims.

What is claimed is:

1. A network slice handover method, comprising:

receiving, by a slice selection network element, resource information of an original network slice from a network slice management function network element, wherein the resource information of the original network slice comprises one or more of the following information: a performance indicator of the original network slice, alarm information of the original network slice, and an analysis report for the original network slice; and determining, by the slice selection network element based on the resource information of the original network slice and a network slice handover policy, whether to hand over a terminal device in the original network slice to a target network slice, wherein the network slice handover policy comprises a trigger condition for network slice handover, an identifier of the target network slice, an identifier of the original network slice, and an identifier and/or an application identifier of the terminal device in the original network slice.

2. The method according to claim 1, wherein the determining whether to hand over a terminal device in the original network slice to a target network slice comprises:

determining, by the slice selection network element, whether the resource information of the original network slice meets the trigger condition for network slice handover; and when the resource information of the original network slice meets the trigger condition for network slice handover, determining, by the slice selection network element, to hand over the terminal device in the original network slice to the target network slice.

3. The method according to claim 2, wherein the method further comprises:

receiving, by the slice selection network element, resource information of the target network slice from the network slice management function network element, wherein the resource information of the target network slice comprises one or more of the following information: a performance indicator of the target network slice, alarm information of the target network slice, and an analysis report for the target network slice; and determining, by the slice selection network element, that the resource information of the target network slice does not meet the trigger condition for network slice handover.

4. The method according to claim 1, wherein the trigger condition for network slice handover comprises one or more of the following:

a performance indicator of a network slice is greater than or equal to a first threshold, or is less than or equal to a second threshold;

the slice selection network element receives alarm information of the network slice and/or the performance indicator of the network slice;

the slice selection network element receives the alarm information of the network slice, wherein the alarm information is high-priority alarm information; and an analysis report for the network slice meets a handover condition.

5. The method according to claim 1, wherein the method further comprises:

sending, by the slice selection network element, a subscription request message to the network slice management function network element, wherein the subscription request message comprises the identifier of the original network slice to subscribe to the resource information of the original network slice.

6. The method according to claim 1, wherein when the slice selection network element determines to hand over the terminal device in the original network slice to the target network slice, the method further comprises:

sending, by the slice selection network element, a network slice configuration request message to a network slice capability management service provisioning network element, wherein the network slice configuration request message comprises the identifier of the target network slice and the identifier and/or the application identifier of the terminal device in the original network slice, and the network slice configuration request message includes a request to configure the target network slice for the terminal device in the original network slice.

7. The method according to claim 6, wherein the method further comprises:

receiving, by the slice selection network element, a network slice configuration response message from the network slice capability management service provisioning network element, wherein the network slice configuration response message indicates that the target network slice is successfully configured for the terminal device; and sending, by the slice selection network element, a network slice configuration feedback message to an application server based on the network slice configuration response message, wherein the network slice configuration feedback message comprises the identifier of the target network slice and the identifier of the terminal device in the original network slice.

8. The method according to claim 7, wherein the method further comprises:

updating, by the slice selection network element, an association relationship between the identifier of the target network slice and the identifier of the terminal device.

9. The method according to claim 1, wherein when the slice selection network element determines not to hand over the terminal device in the original network slice to the target network slice, the method further comprises:

sending, by the slice selection network element, a network slice configuration feedback message to an application server, wherein the network slice configuration feedback message comprises the identifier of the original network slice, and the network slice configuration feedback message indicates that network slice handover for the terminal device in the original network slice fails.

10. The method according to claim 9, wherein the network configuration feedback message further comprises a cause value and/or recommended behavior indication information, the cause value indicates a reason why the terminal device in the original network slice is not handed over to the target network slice, and the recommended behavior indication information indicates an operation to be performed by the application server.

11. The method according to claim 1, wherein the method further comprises:

receiving, by the slice selection network element, a policy configuration request message from a network slice capability management service consumption network element or the application server, wherein the policy configuration request message comprises the network slice handover policy; and storing, by the slice selection network element, the network slice handover policy.

12. The method according to claim 1, wherein the method further comprises:

receiving, by the slice selection network element, a policy modification request message from the network slice capability management service consumption network element or the application server, wherein the policy modification request message comprises policy modification information indicating modification performed on the network slice handover policy; and modifying, by the slice selection network element, the network slice handover policy based on the policy modification information.

13. The method according to claim 1, wherein the method further comprises:

receiving, by the slice selection network element, a policy deletion request message from the network slice capability management service consumption network element or the application server, wherein the policy deletion request message comprises an identifier of the network slice handover policy, and the policy deletion request message indicates to delete the network slice handover policy; and deleting, by the slice selection network element, the network slice handover policy.

14. A network slice handover apparatus, comprising:

a memory comprising a computer program comprising instructions; and at least one processor, wherein execution of the computer program instructions by the at least one processor cause the apparatus to perform operations including:

receiving resource information of an original network slice from a network slice management function network element, wherein the resource information of the original network slice comprises one or more of the following information: a performance indicator of the original network slice, alarm information of the original network slice, and an analysis report for the original network slice; and determining, based on the resource information of the original network slice and a network slice handover policy, whether to hand over a terminal device in the original network slice to a target network slice, wherein the network slice handover policy comprises a trigger condition for network slice handover, an identifier of the target network slice, an identifier of the original network slice, and an identifier and/or an application identifier of the terminal device in the original network slice.

15. A network slice handover method, comprising:

sending, by a network slice management function network element, resource information of an original network slice to a slice selection network element, wherein the resource information of the original network slice comprises one or more of the following information: a performance indicator of the original network slice, alarm information of the original network slice, and an analysis report for the original network slice; and determining, by the slice selection network element based on the resource information of the original network slice and a network slice handover policy, whether to hand over a terminal device in the original network slice to a target network slice, wherein the network slice handover policy comprises a trigger condition for network slice handover, an identifier of the target network slice, an identifier of the original network slice, and an identifier and/or an application identifier of the terminal device in the original network slice.

* * * * *